United States Patent
Mori et al.

(10) Patent No.: US 10,439,535 B2
(45) Date of Patent: Oct. 8, 2019

(54) CONTROL DEVICE OF AC ROTATING MACHINE AND ELECTRIC POWER STEERING DEVICE

(71) Applicant: Mitsubishi Electric Corporation, Tokyo (JP)

(72) Inventors: Tatsuya Mori, Tokyo (JP); Shunsuke Nakajima, Tokyo (JP); Isao Kezobo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/569,136

(22) PCT Filed: Apr. 27, 2015

(86) PCT No.: PCT/JP2015/062644
§ 371 (c)(1),
(2) Date: Oct. 25, 2017

(87) PCT Pub. No.: WO2016/174702
PCT Pub. Date: Nov. 3, 2016

(65) Prior Publication Data
US 2018/0294755 A1    Oct. 11, 2018

(51) Int. Cl.
*H02P 21/18* (2016.01)
*H02P 27/06* (2006.01)
(Continued)

(52) U.S. Cl.
CPC .......... *H02P 21/18* (2016.02); *B62D 5/0463* (2013.01); *H02P 6/08* (2013.01); *H02P 21/22* (2016.02);
(Continued)

(58) Field of Classification Search
CPC .......... H02P 21/18; H02P 21/22; H02P 27/08; H02P 27/16; B62D 5/0463
(Continued)

(56) References Cited

U.S. PATENT DOCUMENTS 3,584,276 A * 6/1971 Ringland ............. H02K 19/103
                                                        318/721
4,442,386 A * 4/1984 Uchida ..................... H02P 6/00
                                                      318/400.03
(Continued)

FOREIGN PATENT DOCUMENTS

| EP | 2 757 023 A2 | 7/2014 |
| JP | 2006-141123 A | 6/2006 |
| JP | 4672236 B2 | 4/2011 |
| JP | 2014-138530 A | 7/2014 |

OTHER PUBLICATIONS

Takaharu Takeshita et al., "Back EMF Estimation-Based Sensorless Salient-Pole Brushless DC Motor Drives", IEE Japan Transactions on Industry Applications, 1997, pp. 98-104, vol. 11 7-D, No. 1.
(Continued)

*Primary Examiner* — Jorge L Carrasquillo
*Assistant Examiner* — Devon A Joseph
(74) *Attorney, Agent, or Firm* — Sughrue Mion, PLLC; Richard C. Turner

(57) ABSTRACT

This invention is concerning a control device of an AC rotating machine that estimates, as an estimated rotational position, a rotational position of an AC rotating machine having N sets of three-phase windings where N is a natural number equal to or greater than 2, the device being made up of: a voltage sum calculator that calculates a voltage sum from N sets of voltage commands for applying AC voltage to the N sets of three-phase windings; a current sum calculator that calculates a current sum from N sets of currents respectively flowing in the N sets of three-phase windings;
(Continued)

and a rotational position estimator that calculates an estimated rotational position on the basis of calculation results of the voltage sum calculator and the current sum calculator.

9 Claims, 14 Drawing Sheets

(51) Int. Cl.
  *H02P 6/08* (2016.01)
  *H02P 21/22* (2016.01)
  *B62D 5/04* (2006.01)
  *H02P 27/08* (2006.01)
  *H02P 27/16* (2006.01)

(52) U.S. Cl.
  CPC ............ *H02P 27/06* (2013.01); *H02P 27/08* (2013.01); *H02P 27/16* (2013.01)

(58) Field of Classification Search
  USPC .......................................................... 318/400
  See application file for complete search history.

(56) References Cited

U.S. PATENT DOCUMENTS

| | | | | |
|---|---|---|---|---|
| 4,472,666 A * | 9/1984 | Akeda | H02H 7/0833 | 318/400.08 |
| 4,772,839 A * | 9/1988 | MacMinn | H02P 6/185 | 318/685 |
| 4,812,729 A * | 3/1989 | Ito | H02H 7/1216 | 318/732 |
| 4,896,089 A * | 1/1990 | Kliman | H02P 1/163 | 318/400.21 |
| 4,994,684 A * | 2/1991 | Lauw | H02P 9/42 | 290/40 C |
| 5,300,870 A * | 4/1994 | Smith | H02P 1/265 | 318/749 |
| 5,390,102 A * | 2/1995 | Araki | H02J 3/46 | 363/71 |
| 5,703,456 A * | 12/1997 | Cox | H02M 3/158 | 318/400.17 |
| 5,708,346 A * | 1/1998 | Schob | F16C 32/0493 | 318/803 |
| 5,936,370 A * | 8/1999 | Fukao | F16C 32/0448 | 318/400.27 |
| 5,967,940 A * | 10/1999 | Yamaguchi | B60K 6/24 | 477/107 |
| 6,014,003 A * | 1/2000 | French | H02P 9/40 | 318/254.2 |
| 6,023,152 A * | 2/2000 | Briest | B30B 15/148 | 307/67 |
| 6,151,227 A * | 11/2000 | Mizutani | H02M 7/49 | 363/41 |
| 6,337,802 B1 * | 1/2002 | Larsson | H02M 7/1552 | 323/908 |
| 6,462,491 B1 * | 10/2002 | Iijima | H02P 9/18 | 318/400.09 |
| 6,548,981 B1 * | 4/2003 | Ishii | H02K 11/04 | 318/15 |
| 7,786,608 B2 * | 8/2010 | Menke | F03D 7/0248 | 290/44 |
| 9,132,525 B2 * | 9/2015 | Shinozaki | B24B 49/16 | |
| 9,712,070 B2 * | 7/2017 | Jimichi | H02M 5/4585 | |
| 10,079,568 B2 * | 9/2018 | Suzuki | B62D 5/0475 | |
| 2002/0145401 A1 * | 10/2002 | Sato | H02P 21/22 | 318/727 |
| 2003/0169015 A1 * | 9/2003 | Royak | H02P 6/185 | 318/727 |
| 2004/0222754 A1 * | 11/2004 | Ochiai | B60L 3/0046 | 318/105 |
| 2004/0255904 A1 * | 12/2004 | Izawa | B60K 6/445 | 123/352 |
| 2005/0029972 A1 * | 2/2005 | Imai | B60L 15/025 | 318/400.04 |
| 2005/0190094 A1 * | 9/2005 | Andersen | H02P 7/29 | 341/157 |
| 2007/0029986 A1 * | 2/2007 | Nakamura | B60L 7/06 | 323/318 |
| 2007/0035978 A1 * | 2/2007 | Newman, Jr. | H02M 1/36 | 363/148 |
| 2007/0086219 A1 * | 4/2007 | Yasumura | H02M 3/33507 | 363/21.02 |
| 2007/0171689 A1 * | 7/2007 | Ishikawa | B60L 15/007 | 363/71 |
| 2007/0222409 A1 * | 9/2007 | Kariatsumari | H02P 21/06 | 318/807 |
| 2008/0012521 A1 * | 1/2008 | Katsumata | H02P 21/02 | 318/632 |
| 2008/0129243 A1 * | 6/2008 | Nashiki | H02K 1/145 | 318/701 |
| 2008/0205106 A1 * | 8/2008 | Nakamura | B60L 15/007 | 363/123 |
| 2009/0200970 A1 * | 8/2009 | Kimura | H02P 27/08 | 318/400.3 |
| 2009/0277702 A1 * | 11/2009 | Kanada | B60W 20/13 | 180/65.29 |
| 2013/0033207 A1 * | 2/2013 | Satou | B62D 5/046 | 318/400.04 |
| 2013/0123671 A1 * | 5/2013 | Ikeuchi | A61H 3/00 | 601/35 |
| 2013/0234635 A1 * | 9/2013 | Kojima | H02P 6/12 | 318/400.21 |
| 2013/0234638 A1 * | 9/2013 | Tanaka | H02P 25/22 | 318/400.27 |
| 2013/0249450 A1 * | 9/2013 | Kwon | H02P 6/08 | 318/400.02 |
| 2013/0249454 A1 | 9/2013 | Mori et al. | | |
| 2013/0307449 A1 * | 11/2013 | Kobayashi | B60K 6/48 | 318/400.02 |
| 2014/0015459 A1 * | 1/2014 | Vilar | H02P 23/14 | 318/400.15 |
| 2014/0100701 A1 * | 4/2014 | Hakumura | H02P 21/05 | 700/280 |
| 2014/0207335 A1 * | 7/2014 | Mikamo | B62D 5/046 | 701/41 |
| 2014/0217946 A1 * | 8/2014 | Kume | H02P 25/188 | 318/497 |
| 2015/0002106 A1 * | 1/2015 | Inagaki | H02M 5/4585 | 322/79 |
| 2015/0236603 A1 * | 8/2015 | Jimichi | H02M 5/293 | 363/37 |
| 2015/0365040 A1 * | 12/2015 | Saha | B60L 1/00 | 318/400.25 |
| 2015/0372606 A1 * | 12/2015 | Tamura | H02M 3/33584 | 363/21.04 |
| 2016/0072416 A1 * | 3/2016 | Hirotani | H02P 25/22 | |
| 2016/0109265 A1 * | 4/2016 | Ishida | G01D 5/208 | 324/207.25 |
| 2016/0233801 A1 * | 8/2016 | Sakai | H02M 7/5395 | |
| 2016/0315577 A1 * | 10/2016 | Suzuki | H02P 29/50 | |
| 2017/0179868 A1 * | 6/2017 | Suzuki | H02P 29/50 | |
| 2017/0297616 A1 * | 10/2017 | Kikuchi | B62D 5/04 | |
| 2017/0302203 A1 * | 10/2017 | Takatsu | H02P 8/12 | |
| 2018/0006547 A1 * | 1/2018 | Mori | H02P 21/22 | |
| 2018/0022378 A1 * | 1/2018 | Furukawa | H02P 6/08 | 324/76.77 |
| 2018/0048256 A1 * | 2/2018 | Schwarzkopf | H02P 29/50 | |
| 2018/0062547 A1 * | 3/2018 | Dutta | H02P 6/04 | |
| 2018/0287522 A1 * | 10/2018 | Flynn | H02P 1/465 | |
| 2018/0294755 A1 * | 10/2018 | Mori | H02P 21/18 | |

OTHER PUBLICATIONS

Shinji Ichikawa et al., "Sensorless Control of an IPMSM by Estimation of an Extended EMF on the Rotating Reference Frame", The 2001 Annual Meeting of the Institute of Electrical Engineers of Japan, 2001, pp. 1401-1402.

(56) References Cited

OTHER PUBLICATIONS

International Search Report for PCT/JP2015/062644, dated Jul. 21, 2015.
Communication dated Jan. 8, 2019, from the European Patent Office in counterpart European Application No. 15890686.7.

* cited by examiner

ELECTRICAL ANGLE (deg)

ELECTRICAL ANGLE (deg)

CONTROL DEVICE OF AC ROTATING MACHINE AND ELECTRIC POWER STEERING DEVICE

CROSS REFERENCE TO RELATED APPLICATIONS

This application is a National Stage of International Application No. PCT/JP2015/062644 filed Apr. 27, 2015, the contents of all of which are incorporated herein by reference in their entirety.

TECHNICAL FIELD

The present invention relates to a control device of an AC rotating machine estimating the rotational position of an AC rotating machine, and to an electric power steering device provided with the control device of an AC rotating machine.

BACKGROUND ART

High-precision control of the rotational motion of an AC rotating machine requires information relating to the rotational position of the AC rotating machine, and information relating to the current flowing in the windings of the AC rotating machine. The rotational position of an AC rotating machine may in some instances be acquired by a rotational position sensor that is provided separately in the AC rotating machine.

However, separately providing a rotational position sensor in the AC rotating machine is significantly disadvantageous in terms of cost reduction, space saving and increasing reliability. Therefore, a rotational position estimation function is required in order to realize sensorless rotational position sensing.

Moreover, a configuration in which the AC rotating machine is controlled using an estimated rotational position allows for continued operation of the AC rotating machine even in cases of malfunction of the rotational position sensor. Therefore, a rotational position estimation function is also required in order to cope with malfunction of a rotational position sensor.

Therefore, the dependence of induced voltage on rotational position in a synchronous motor has been exploited conventionally to estimate rotational position on the basis of the voltage applied to the synchronous motor, the current flowing in the synchronous motor, and the electrical constants of the synchronous motor (see for instance PTL 1, NPL 1 and NPL 2). The rotational position estimation scheme disclosed in PTL 1, NPL 1 and NPL 2, referred to as "induced voltage scheme" is a widely recognized scheme.

CITATION LIST

Patent Literature

[PTL 1] Japanese Patent No. 4672236

Non Patent Literature

[NPL 1] TAKESHITA Takaharu et al. "Back EMF Estimation-Based Sensorless Salient-Pole Brushless DC Motor Drives"; The transactions of the Institute of Electrical Engineers of Japan. Vol. 117-D, No. 1, 1997, pp. 98 to 104
[NPL 2] ICHIKAWA Shinji et al., "IPMSM Sensorless Control by Extended Induced Voltage Estimation in a Rotating Coordinate System", The 2001 Annual Meeting of the Institute of Electrical Engineers of Japan, 2001 issue, pp. 1401 to 1402

SUMMARY OF INVENTION

Technical Problem

As described above, information relating to the voltage applied to the synchronous motor, the current flowing in the synchronous motor and electrical constants of the synchronous motor is necessary in the rotational position estimation scheme referred to as "induced voltage scheme".

Firstly, however, an error arises between the true rotational position of the synchronous motor and the rotational position estimated in accordance with the induced voltage scheme, in a case where an error arises between a true electrical constant of the synchronous motor and the electrical constant used in the induced voltage scheme.

Secondly, an error arises between the true rotational position of the synchronous motor and the rotational position estimated in accordance with the induced voltage scheme, in a case where an error arises between the true voltage applied to the synchronous motor and the voltage used in the induced voltage scheme.

Separately providing a sensor for detecting voltage applied to the synchronous motor entails higher costs, and hence the voltage applied to the synchronous motor is not detected using a sensor. In induced voltage schemes, accordingly, the rotational position is often estimated using a voltage command corresponding to the voltage that is applied to the synchronous motor. This often gives rise to the problem of error between the true voltage applied to the synchronous motor and the voltage command, in particular errors caused by the dead time of a power converter.

Thirdly, an error arises between the true rotational position of the synchronous motor and the rotational position estimated in accordance with the induced voltage scheme, in a case where an error arises between the true current flowing in the synchronous motor and the current used in the induced voltage scheme.

Thus, an error arises between the true rotational position of the synchronous motor and the rotational position estimated in accordance with the induced voltage scheme, in a case where errors arise in physical quantities such as electrical constants of the synchronous motor, as well as in the voltage and the current that are used in the induced voltage scheme, with respect to the true physical quantities of the synchronous motor. The control performance of the synchronous motor is impaired as a result.

In a conceivable instance, the rotational position is estimated in accordance with an induced voltage scheme on the basis of a physical quantity corresponding to one set of three-phase windings from among a plurality of sets, in an AC rotating machine having a plurality of sets of three-phase windings. In this case, an error arises between the true rotational position of the synchronous motor and the rotational position estimated in accordance with the induced voltage scheme, when an error arises between the true physical quantity corresponding to the one set of three-phase windings and the physical quantity used in the induced voltage scheme.

In an AC rotating machine having a plurality of sets of three-phase windings, it is further conceivable to estimate the rotational position of each set in accordance with an induced voltage scheme, on the basis of a physical quantity corresponding to each set of three-phase windings in the plurality of sets, and to use, as a finally estimated rotational position, an average value of the rotational position estimated for each set. In this case, the error in the rotational position estimated for each set is averaged, and hence there is reduced the error of the finally estimated rotational position with respect to the true rotational position of the AC rotating machine. Herein it is however necessary to execute a rotational position calculation for estimating the rotational position for each set. Therefore, the amount of computation in the rotational position calculation increases proportionally to the number of sets of three-phase windings of the AC rotating machine, and as a result it is difficult to implement a rotational position estimation function in an inexpensive microcomputer.

It is an object of the present invention, arrived at in order to solve the above problems, to achieve a control device of an AC rotating machine that allows easily implementing a rotational position estimation function in an inexpensive microcomputer, while making it possible to estimate, with higher precision than in conventional art, the rotational position of an AC rotating machine having a plurality of sets of three-phase windings, and to achieve an electric power steering device provided with that control device of an AC rotating machine.

Solution to Problem

The control device of an AC rotating machine of the present invention is a control device of an AC rotating machine estimating, as an estimated rotational position, a rotational position of an AC rotating machine having N sets of three-phase windings, where N is a natural number equal to or greater than 2, the control device including: a current detector that detects and outputs N sets of currents respectively flowing in N sets of three-phase windings; a controller that calculates and outputs N sets of voltage commands of respective N sets of three-phase windings on the basis of a control command for the AC rotating machine and N sets of currents input from the current detector; and a power converter that applies AC voltage to the N sets of three-phase windings on the basis of the input N sets of voltage commands, wherein the controller has a voltage sum calculator that calculates and outputs a voltage sum from the input N sets of voltage commands; a current sum calculator that calculates and outputs a current sum from the input N sets of currents; and a rotational position estimator that calculates the estimated rotational position on the basis of the input voltage sum and the input current sum.

An electric power steering device of the present invention is provided with: a control device of an AC rotating machine; a torque detector that detects steering torque; and a control command calculator that calculates a control command for the AC rotating machine on the basis of the steering torque detected by the torque detector, so that the AC rotating machine generates torque that assists the steering torque.

Advantageous Effects of Invention

In the present invention, a control device of an AC rotating machine estimating, as an estimated rotational position, a rotational position of an AC rotating machine having N sets of three-phase windings, where N is a natural number equal to or greater than 2, is configured by being provided with: a voltage sum calculator that calculates a voltage sum from N sets of voltage commands for applying AC voltage to the N sets of three-phase windings, and a current sum calculator that calculates a current sum from N sets of currents respectively flowing in the N sets of three-phase windings, and a rotational position estimator that calculates an estimated rotational position on the basis of the calculation results of the voltage sum calculator and the current sum calculator. As a result, it becomes possible to achieve a control device of an AC rotating machine that allows easily implementing a rotational position estimation function in an inexpensive microcomputer, while making it possible to estimate, with higher precision than in conventional art, the rotational position of an AC rotating machine having a plurality of sets of three-phase windings, and to achieve an electric power steering device provided with that control device of an AC rotating machine.

DESCRIPTION OF EMBODIMENTS

Preferred embodiments of the control device of an AC rotating machine and of the electric power steering device of the present invention will be explained next with reference to accompanying drawings. In the explanation of the drawings, identical or corresponding portions will be denoted by identical reference symbols, and a recurrent explanation thereof will be omitted.

Embodiment 1

Figure 1:
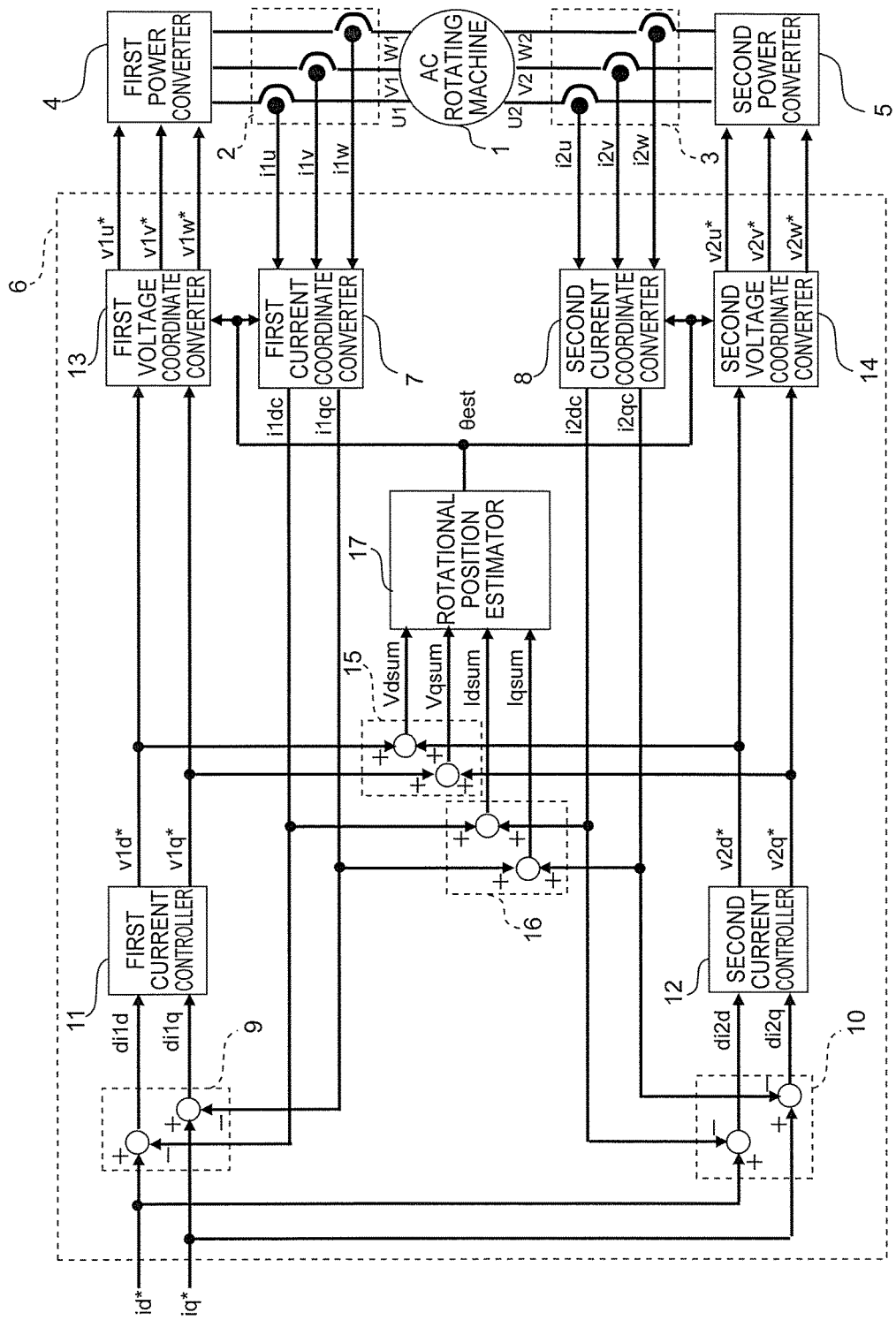
FIG. 1 is a configuration diagram illustrating the entirety of a control device of an AC rotating machine of Embodiment 1 of the present invention.
Figure 2:
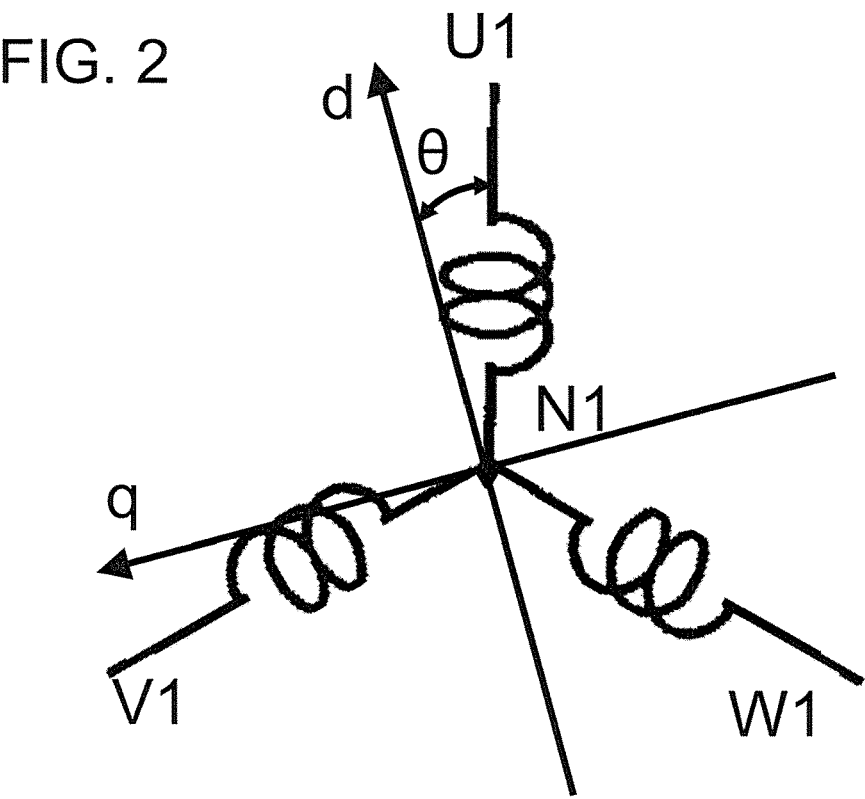
FIG. 2 is a configuration diagram illustrating first three-phase windings of the AC rotating machine of FIG. 1.
Figure 3:
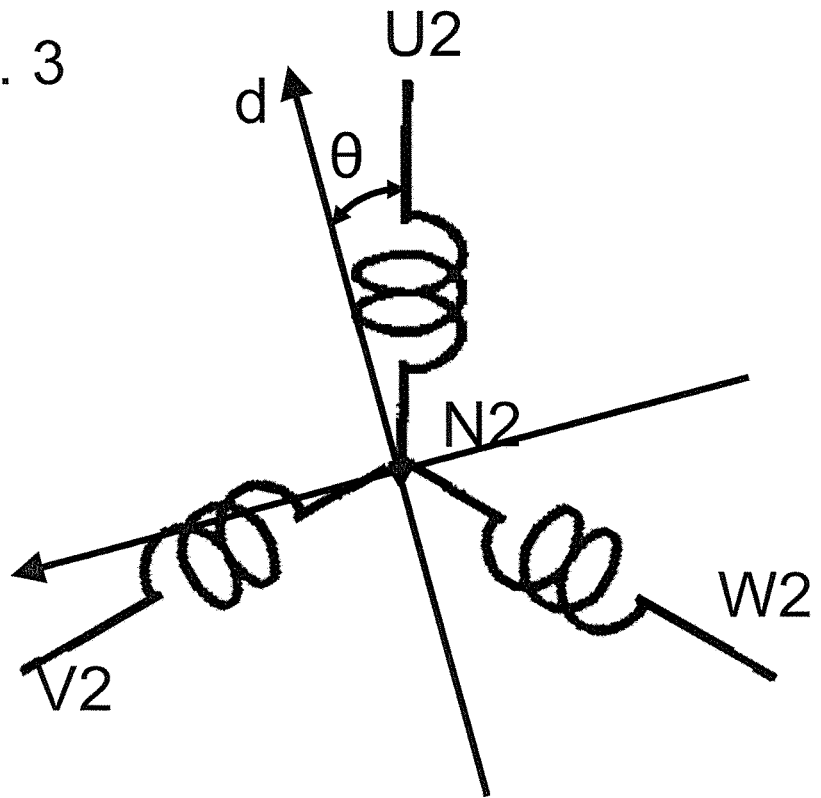
FIG. 3 is a configuration diagram illustrating second three-phase windings of the AC rotating machine of FIG. 1.

FIG. 1 is a configuration diagram illustrating the entirety of a control device of an AC rotating machine of Embodiment 1 of the present invention. FIG. 2 is a configuration diagram illustrating first three-phase windings of an AC rotating machine 1 of FIG. 1. FIG. 3 is a configuration diagram illustrating second three-phase windings of the AC rotating machine 1 of FIG. 1. FIG. 1 illustrates also the AC rotating machine 1 being the control target of the control device of the control device of an AC rotating machine of the present Embodiment 1.

As illustrated in FIG. 1, the control device of an AC rotating machine of the present Embodiment 1 is provided with a first current detector 2, a second current detector 3, a first power converter 4, a second power converter 5 and a controller 6.

The AC rotating machine 1, which is a synchronous rotating machine, has first three-phase windings and second three-phase windings as two sets of three-phase windings. Specifically, the AC rotating machine 1 has first three-phase windings made up of a U-phase winding U1, a V-phase winding V1 and a W-phase winding W1, and second three-phase windings made up of a U-phase winding U2, a V-phase winding V2 and a W-phase winding W2. The AC rotating machine 1 has a rotor (not shown) configured so that field magnetic flux is generated by permanent magnets or by field system windings.

In the first three-phase windings and the second three-phase windings, the U1 phase and the U2 phase, the V1 phase and the V2 phase, and the W1 phase and the W2 phase are all respectively disposed at identical phase, as illustrated in FIG. 2 and FIG. 3. Defining as the d-axis the direction of magnetic flux generated by the rotor of the AC rotating machine 1, and defining as the q-axis a direction advanced from the d-axis by an electrical angle of 90 degrees, the angle formed by the U-phase winding U1 and the d-axis, and the angle formed by the U-phase winding U2 and the d-axis, are both θ degrees, as illustrated in FIG. 2 and FIG. 3. The angle θ is referred to as the true rotational position θ of the AC rotating machine.

The present Embodiment 1 will be explained by illustrating an instance where the AC rotating machine 1 is a permanent-magnet synchronous rotating machine having two sets of three-phase windings. However, the invention of the present application can be used also in a permanent magnet synchronous rotating machine having three or more sets of three-phase windings, and in a synchronous rotating machine of field winding type.

The voltage equation of the first three-phase windings on d-q axis coordinates is as given by Expression (1) below, and the voltage equation of the second three-phase windings on the d-q axis coordinates is as given by Expression (2) below.

[Math. 1]

$$\begin{bmatrix} v_{d1} \\ v_{q1} \end{bmatrix} = \begin{bmatrix} R_1 + pL_{d1} & -\omega L_{q1} \\ \omega L_{d1} & R_1 + pL_{q1} \end{bmatrix} \begin{bmatrix} i_{d1} \\ i_{q1} \end{bmatrix} + \begin{bmatrix} 0 \\ \omega \phi_1 \end{bmatrix} \quad (1)$$

[Math. 2]

$$\begin{bmatrix} v_{d2} \\ v_{q2} \end{bmatrix} = \begin{bmatrix} R_2 + pL_{d2} & -\omega L_{q2} \\ \omega L_{d2} & R_2 + pL_{q2} \end{bmatrix} \begin{bmatrix} i_{d2} \\ i_{q2} \end{bmatrix} + \begin{bmatrix} 0 \\ \omega \phi_2 \end{bmatrix} \quad (2)$$

In Expression (1) and Expression (2), Vd1 represents the d-axis voltage of the first three-phase windings, Vd2 represents the d-axis voltage of the second three-phase windings, Vq1 represents the q-axis voltage of the first three-phase windings and Vq2 represents the q-axis voltage of the second three-phase windings. Further, id1 represents the d-axis current of the first three-phase windings, id2 represents the d-axis current of the second three-phase windings, iq1 represents the q-axis current of the first three-phase windings and iq2 represents the q-axis current of the second three-phase windings. Further, R1 represents the winding resistance of the first three-phase windings, R2 represents the winding resistance of the second three-phase windings, Ld1 represents the d-axis inductance of the first three-phase windings, Ld2 represents the d-axis inductance of the second three-phase windings, Lq1 represents the q-axis inductance of the first three-phase windings and Lq2 represents the q-axis inductance of the second three-phase windings. Further, φ1 represents the number of flux linkages of the first three-phase windings, φ2 represents the number of flux linkages of the second three-phase windings, ω represents electrical angular velocity, and p represents a differential operator.

The first current detector 2 and the second current detector 3 are configured using a conventional current detector such as a shunt resistor or a Hall element.

The first current detector 2 detects a U-phase current i1u flowing in the U-phase winding U1, a V-phase current i1v flowing in the V-phase winding V1 and a W-phase current i1w flowing in the W-phase winding W1. The U-phase current i1u, the V-phase current i1v and the W-phase current i1w are collectively referred to as first three-phase winding currents. The first current detector 2 outputs the detected first three-phase winding currents to the controller 6.

The second current detector 3 detects a U-phase current i2u flowing in the U-phase winding U2, a V-phase current i2v flowing in the V-phase winding V2 and a W-phase current i2w flowing in the W-phase winding W2. The U-phase current i2u, the V-phase current i2v and the W-phase current i2w are collectively referred to as second three-phase winding currents. The second current detector 3 outputs the detected second three-phase winding currents to the controller 6.

The first power converter 4 and the second power converter 5 are configured using a conventional power converter such as an inverter or matrix converter.

The first power converter 4 applies AC voltage to the U-phase winding U1, the V-phase winding V1 and the W-phase winding W1 of the first three-phase windings, by execution of a conventional modulation process on a first three-phase voltage command described below.

The second power converter 5 applies AC voltage to the U-phase winding U2, the V-phase winding V2 and the W-phase winding W2 of the second three-phase windings, by execution of a conventional modulation process on a second three-phase voltage command described below.

Examples of the conventional modulation process carried out by the first power converter 4 and the second power converter 5 include for instance PWM (Pulse Width Modulation) schemes and PAM (Pulse Amplitude Modulation) schemes.

The controller 6 is configured using a calculator such as a microcomputer, a DSP (Digital Signal Processor) or FPGA (Field Programmable Gate Array) or the like. The controller 6, which is digitally controlled according to a control cycle Tc, outputs a first three-phase voltage command and a second three-phase voltage command on the basis of first three-phase winding currents, second three-phase winding currents and a control command that are input.

The constituent units of the controller 6 will be explained next. The controller 6 has a first current coordinate converter 7, a second current coordinate converter 8, a first current subtractor 9, a second current subtractor 10, a first current controller 11, a second current controller 12, a first voltage coordinate converter 13, a second voltage coordinate converter 14, a voltage adder 15, a current adder 16 and a rotational position estimator 17.

The first current coordinate converter 7 calculates a first d-axis current i1$dc$ and a first q-axis current i1$qc$ in the d-q axes corresponding to two rotating axes, on the basis of the first three-phase winding currents input from the first current detector 2 and an estimated rotational position θest input from the rotational position estimator 17. The first d-axis current i1$dc$ and the first q-axis current i1$qc$ will be collectively referred to as first dq axes currents. The first current coordinate converter 7 outputs the calculated first dq axes currents to the first current subtractor 9 and the current adder 16.

The second current coordinate converter 8 calculates a second d-axis current i2$dc$ and a second q-axis current i2$qc$ in the d-q axes corresponding to two rotating axes, on the basis of the second three-phase winding currents input from the second current detector 3 and the estimated rotational position θest input from the rotational position estimator 17. The second d-axis current i2$dc$ and the second q-axis current i2$qc$ will be collectively referred to as second dq axes currents. The second current coordinate converter 8 outputs the calculated second dq axes currents to the second current subtractor 10 and the current adder 16.

A d-axis current command id* and a q-axis current command iq* are input, as a control command for the AC rotating machine 1, to the first current subtractor 9 and the second current subtractor 10, respectively. The d-axis current command id* and the q-axis current command iq* will be collectively referred to as dq axes current commands. The d-axis current command id* is a command value for the first d-axis current i1$dc$ and the second d-axis current i2$dc$. The q-axis current command iq* is a command value for the first q-axis current i1$qc$ and the second q-axis current i2$qc$. In other words, the dq axes current commands correspond to the control command for controlling the AC rotating machine 1. In the present Embodiment 1 there is illustrated an instance where the dq axes current commands are set as the control command, but a speed command may be set as the control command in a case where a conventional speed control scheme, V/f control or the like is resorted to.

The first current subtractor 9 outputs to the first current controller 11, as a deviation di1$d$, a value obtained by subtracting, from the d-axis current command id*, the first d-axis current i1$dc$ that is input from the first current coordinate converter 7. The first current subtractor 9 outputs to the first current controller 11, as a deviation di1$q$, a value obtained by subtracting, from the q-axis current command iq*, the first q-axis current i1$qc$ that is input from the first current coordinate converter 7. The deviation di1$d$ and the deviation di1$q$ are given by the expressions below.

$$di1d = id^* - i1dc$$

$$di1q = iq^* - i1qc$$

The second current subtractor 10 outputs to the second current controller 12, as a deviation di2$d$, a value obtained by subtracting, from the d-axis current command id*, the second d-axis current i2$dc$ that is input from the second current coordinate converter 8. The second current subtractor 10 outputs to the second current controller 12, as a deviation di2$q$, a value obtained by subtracting, from the q-axis current command iq*, the second q-axis current i2$qc$ that is input from the second current coordinate converter 8. The deviation di2$d$ and the deviation di2$q$ are given by the expressions below.

$$di2d = id^* - i2dc$$

$$di2q = iq^* - i2qc$$

The first current controller 11 calculates a first d-axis voltage command v1$d$* and a first q-axis voltage command v1$q$* on the two rotating axes by performing proportional integral control, or proportional control, in such a manner that both the deviation di1$d$ and the deviation di1$q$ input from the first current subtractor 9 match zero. The first d-axis voltage command v1$d$* and the first q-axis voltage command v1$q$* will be collectively referred to as first dq axes voltage commands. The first current controller 11 outputs the first dq axes voltage commands to the first voltage coordinate converter 13 and the voltage adder 15.

The second current controller 12 calculates a second d-axis voltage command v2$d$* and a second q-axis voltage command v2$q$* on the two rotating axes by performing proportional integral control, or proportional control, in such a manner that both the deviation di2$d$ and the deviation di2$q$ input from the second current subtractor 10 match zero. The second d-axis voltage command v2$d$* and the second q-axis voltage command v2$q$* will be collectively referred to as second dq axes voltage commands. The second current controller 12 outputs the second dq axes voltage commands to the second voltage coordinate converter 14 and the voltage adder 15.

The first voltage coordinate converter 13 calculates a U-phase voltage command v1$u$*, a V-phase voltage command v1$v$* and a W-phase voltage command v1$w$* for the first three-phase windings, on the basis of the first dq axes voltage commands input from the first current controller 11. The U-phase voltage command v1$u$*, the V-phase voltage command v1$v$* and the W-phase voltage command v1$w$* will be collectively referred to as a first three-phase voltage command. The first voltage coordinate converter 13 outputs the calculated first three-phase voltage command to the first power converter 4.

The second voltage coordinate converter 14 calculates a U-phase voltage command v2u*, a V-phase voltage command v2v* and a W-phase voltage command v2w* for the second three-phase windings, on the basis of the second dq axes voltage commands input from the second current controller 12. The U-phase voltage command v2u*, the V-phase voltage command v2v* and the W-phase voltage command v2w* will be collectively referred to as a second three-phase voltage command. The second voltage coordinate converter 14 outputs the calculated second three-phase voltage command to the second power converter 5.

The voltage adder 15 outputs to the rotational position estimator 17, as a d-axis voltage sum Vdsum, a value resulting from adding the first d-axis voltage command v1d* input from the first current controller 11 and the second d-axis voltage command v2d* input from the second current controller 12. The voltage adder 15 outputs to the rotational position estimator 17, as a q-axis voltage sum Vqsum, a value resulting from adding the first q-axis voltage command v1q* input from the first current controller 11 and the second q-axis voltage command v2q* input from the second current controller 12. The d-axis voltage sum Vdsum and the q-axis voltage sum Vqsum will be collectively referred to as dq axes voltage sums. The voltage adder 15 is an example of a voltage sum calculator that calculates dq axes voltage sums.

The current adder 16 outputs to the rotational position estimator 17, as a d-axis current sum Idsum, a value resulting from adding the first d-axis current i1dc input from the first current coordinate converter 7 and the second d-axis current i2dc input from the second current coordinate converter 8. The current adder 16 outputs to the rotational position estimator 17, as a q-axis current sum Iqsum, a value resulting from adding the first q-axis current i1qc input from the first current coordinate converter 7 and the second q-axis current i2qc input from the second current coordinate converter 8. The d-axis current sum Idsum and the q-axis current sum Iqsum will be collectively referred to as dq axes current sums. The current adder 16 is an example of a current sum calculator that calculates dq axes current sums.

The rotational position estimator 17 calculates the estimated rotational position θest on the basis of the dq axes voltage sums input from the voltage adder 15, the dq axes current sums input from the current adder 16, and set values of electrical constants of the AC rotating machine 1. The electrical constants of the AC rotating machine 1 refer herein to winding resistance, inductance and number of flux linkages.

The rotational position estimator 17 outputs the calculated estimated rotational position θest to the first current coordinate converter 7, the second current coordinate converter 8, the first voltage coordinate converter 13 and the second voltage coordinate converter 14.

Calculation of the estimated rotational position θest by the rotational position estimator 17 will be explained next. Herein Expression (3) is obtained by calculating a sum of Expression (1) and Expression (2), assuming that the respective winding resistances, inductances and numbers of flux linkages of the first three-phase windings and second three-phase windings are equal.

[Math. 3]

$$\begin{bmatrix} v_{d1} + v_{d2} \\ v_{q1} + v_{q2} \end{bmatrix} = \begin{bmatrix} R_1 + pL_{d1} & -\omega L_{q1} \\ \omega L_{d1} & R_1 + pL_{q1} \end{bmatrix} \begin{bmatrix} i_{d1} + i_{d2} \\ i_{q1} + i_{q2} \end{bmatrix} + \begin{bmatrix} 0 \\ 2\omega\phi_1 \end{bmatrix} \quad (3)$$

Voltage sum equations are defined as in Expression (4) and Expression (5) below, with vd1+vd2, vq1+vq2, id1+id2 and iq1+iq2 in Expression (3) corresponding respectively to the d-axis voltage sum Vdsum, the q-axis voltage sum Vqsum, the d-axis current sum Idsum and the q-axis current sum Iqsum.

[Math. 4]

$$\begin{bmatrix} V_{dsum} \\ V_{qsum} \end{bmatrix} = \begin{bmatrix} R_c + pL_{dc} & -\omega L_{qc} \\ \omega L_{dc} & R_c + pL_{qc} \end{bmatrix} \begin{bmatrix} i_{dsum} \\ i_{qsum} \end{bmatrix} + \begin{bmatrix} 0 \\ \omega\phi_c \end{bmatrix} \quad \text{(if } \Delta\theta = 0\text{)} \quad (4)$$

[Math. 5]

$$\begin{bmatrix} V_{dsum} \\ V_{qsum} \end{bmatrix} = \begin{bmatrix} R_c + pL_{dc} & -\omega L_{qc} \\ \omega L_{dc} & R_c + pL_{qc} \end{bmatrix} \begin{bmatrix} i_{dsum} \\ i_{qsum} \end{bmatrix} + \begin{bmatrix} -\omega\phi_c \sin(\Delta\theta) \\ \omega\phi_c \cos(\Delta\theta) \end{bmatrix} \quad (5)$$

$$\text{(if } \Delta\theta \neq 0\text{)}$$

In Expression (4) and Expression (5), Rc, Ldc, Lqc, and φc denote electrical constants that are set in the rotational position estimator 17. Specifically, Rc denotes the set value of winding resistance, Ldc denotes the set value of d-axis inductance, Lqc denotes the set value of q-axis inductance and φc denotes the set value of number of flux linkages. Further, Δθ denotes a rotational position error, corresponding to a value obtained by subtracting the true rotational position θ from the estimated rotational position θest.

The set value Rc of the winding resistance is set so as to yield a specification value or measured value of the winding resistance R1 and the winding resistance R2. The set value Ldc of the d-axis inductance is set to yield a specification value or measured value of the d-axis inductance Ld1 and the d-axis inductance Ld2. The set value Lqc of the q-axis inductance is set to yield a specification value or measured value of the q-axis inductance Lq1 and the q-axis inductance Lq2. The set value φc of the number of flux linkages is set to yield the double of a specification value or measured value of the number of flux linkages φ1 and the number of flux linkages φ2.

Next, the d-axis voltage sum Vdsum, q-axis voltage sum Vqsum, d-axis current sum Idsum, and q-axis current sum Iqsum that are calculated by the controller 6 at the control cycle Tc will be notated as d-axis voltage sum Vdsum (n), q-axis voltage sum Vqsum (n), d-axis current sum Idsum (n) and q-axis current sum Iqsum (n), using a sample number n. The rotational speed estimated by the controller 6 is ωest. Herein Expression (7) below is obtained by using an approximate expression, as given by the Expression (6), in Expression (4).

[Math. 6]

$$\frac{dI}{dt} = \frac{I(n) - I(n-1)}{T_c} \quad (6)$$

-continued

[Math. 7]

$$\begin{bmatrix} I_{dsum\_cal}(n) \\ I_{qsum\_cal}(n) \end{bmatrix} = \begin{bmatrix} 1 - \frac{R_c}{L_{dc}}T_c & -\omega_{est}\frac{L_{qc}}{L_{dc}}T_c \\ -\omega_{est}\frac{L_{dc}}{L_{qc}}T_c & 1 - \frac{R_c}{L_{qc}}T_c \end{bmatrix} \begin{bmatrix} I_{dsum}(n-1) \\ I_{qsum}(n-1) \end{bmatrix} + \frac{T_c}{L_{dc}L_{qc}} \left[ \begin{bmatrix} L_{qc}V_{dsum}(n-1) \\ L_{dc}V_{qsum}(n-1) \end{bmatrix} - \begin{bmatrix} 0 \\ L_{dc}\omega_{est}\phi_c \end{bmatrix} \right] \quad (7)$$

Similarly, Expression (8) below is obtained by using in Expression (5) an approximate expression, as given by the Expression (6).

[Math. 8]

$$\begin{bmatrix} I_{dsum}(n) \\ I_{qsum}(n) \end{bmatrix} = \begin{bmatrix} 1 - \frac{R_c}{L_{dc}}T_c & -\omega\frac{L_{qc}}{L_{dc}}T_c \\ -\omega\frac{L_{dc}}{L_{qc}}T_c & 1 - \frac{R_c}{L_{qc}}T_c \end{bmatrix} \begin{bmatrix} I_{dsum}(n-1) \\ I_{qsum}(n-1) \end{bmatrix} + \frac{T_c}{L_{dc}L_{qc}} \left[ \begin{bmatrix} L_{qc}V_{dsum}(n-1) \\ L_{dc}V_{qsum}(n-1) \end{bmatrix} - \omega\phi_c \begin{bmatrix} -L_{qc}\sin(\Delta\theta) \\ L_{dc}\cos(\Delta\theta) \end{bmatrix} \right] \quad (8)$$

Next, Expression (9) is obtained by subtracting Expression (7) from Expression (8).

[Math. 9]

$$\begin{bmatrix} \Delta I_{dsum}(n) \\ \Delta I_{qsum}(n) \end{bmatrix} = \begin{bmatrix} I_{dsum}(n) - I_{dsum\_cal}(n) \\ I_{qsum}(n) - I_{qsum\_cal}(n) \end{bmatrix} = \frac{\phi_c T_c}{L_{dc}L_{qc}} \begin{bmatrix} \omega L_{qc}\sin(\Delta\theta) \\ \omega_{est}L_{dc} - \omega L_{dc}\cos(\Delta\theta) \end{bmatrix} \doteq \frac{\phi_c T_c}{L_{dc}L_{qc}} \begin{bmatrix} \omega L_{qc}\Delta\theta \\ L_{dc}\Delta\omega \end{bmatrix} \quad (9)$$

In Expression (9) there are approximated $\sin(\Delta\theta)\approx\Delta\theta$; $\cos(\Delta\theta)\approx 1$, with $\Delta\theta\approx 0$. Further, a rotational speed error $\Delta\omega$ is $\Delta\omega=\omega_{est}-\omega$. In Expression (9) a d-axis current error $\Delta I_{dsum}(n)$ is proportional to a rotational position error $\Delta\theta$ and a q-axis current error $\Delta I_{qsum}(n)$ is proportional to the rotational speed error $\Delta\omega$.

The calculation of the estimated rotational position $\theta est$ by the rotational position estimator 17 will be further explained next with reference to Expression (7), Expression (8) and Expression (9).

In Expression (7), d-axis current sum Idsum_cal (n) and q-axis current sum Iqsum_cal (n) are calculated from d-axis voltage sum Vdsum (n−1), q-axis voltage sum Vqsum (n−1), d-axis current sum Idsum (n−1) and q-axis current sum Iqsum (n−1), being (n−1)th sample values directly preceding the sample number n, and on the basis of the rotational speed west estimated by the controller 6.

Expression (7) is derived from Expression (4) and Expression (6), assuming $\Delta\theta=0$ and $\omega_{est}=\omega$. In a case where there holds $\Delta\theta=0$ and $\omega_{est}=\omega$, therefore, Idsum_cal (n) and Iqsum_cal (n) being the left terms of Expression (7) coincide with d-axis current sum Idsum (n) and q-axis current sum Iqsum (n) of sample number n. In a case where $\omega_{est}\neq\omega$, Idsum_cal (n) and Iqsum_cal (n) do not match d-axis current sum Idsum (n) and q-axis current sum Iqsum (n).

Further, the first d-axis voltage command v1*d** and the second d-axis voltage command v2*d**, corresponding to d-axis voltage sum Vdsum (n−1), and the first q-axis voltage command v1*q** and the second q-axis voltage command v2*q**, corresponding to q-axis voltage sum Vqsum (n−1), are applied to the AC rotating machine 1. In this case, d-axis current sum Idsum (n) and q-axis current sum Iqsum (n) satisfy the relationship of Expression (8).

Therefore, the rotational position estimator 17 calculates Idsum_cal (n) and Iqsum_cal (n) according to Expression (7) from d-axis voltage sum Vdsum (n−1), q-axis voltage sum Vqsum (n−1), d-axis current sum Idsum (n−1) and q-axis current sum Iqsum (n−1), and the rotational speed west estimated by the controller 6.

Next, the rotational position estimator 17 performs control so that $\Delta$Idsum (n), being the difference between the calculated Idsum_cal (n) and d-axis current sum Idsum (n) input from the current adder 16, is 0, to thereby cause the rotational position error $\Delta\theta$ to converge to 0, according to Expression (9). That is, the rotational position estimator 17 calculates the estimated rotational position $\theta est$ so that the d-axis current error $\Delta$Idsum (n) is 0.

Simultaneously, the rotational position estimator 17 performs control so that $\Delta$Iqsum (n), being the difference between the calculated Iqsum_cal (n) and q-axis current sum Iqsum (n) input from the current adder 16, is 0, to thereby cause the rotational speed error $\Delta\omega$ to converge to 0, according to Expression (9). That is, the rotational position estimator 17 calculates the rotational speed $\omega est$ so that a q-axis current error $\Delta$Iqsum (n) is 0.

The effect elicited by the control device of an AC rotating machine of the present Embodiment 1 will be explained next. Herein Expression (1) being the voltage equation for the first three-phase windings and Expression (2) being the voltage equation for the second three-phase windings are voltage equations of an ordinary synchronous rotating machine. In a conceivable instance there is used for example the rotational position estimation scheme referred to as "induced voltage scheme" disclosed in NPL 1.

In this case, the rotational position can be estimated on the basis of the first dq axes voltage commands and the first dq axes currents, according to Expression (1). Similarly, the rotational position can be estimated on the basis of the second dq axes voltage commands and the second dq axes currents, according to Expression (2).

In another conceivable instance, one set of three-phase windings is selected from among the two sets of three-phase windings, i.e. first three-phase windings and second three-phase windings, whereupon the rotational position is estimated in accordance with an induced voltage scheme on the basis of a physical quantity corresponding to the selected three-phase windings. In this case, an error arises between the true rotational position of the AC rotating machine 1 and the rotational position estimated in accordance with the induced voltage scheme. As an example, the first three-phase windings will be selected herein.

Specifically, an error arises between the true rotational position of the AC rotating machine 1 and the rotational position estimated in accordance with an induced voltage scheme, in a case where an error arises between voltage commands calculated by the controller 6, as the voltage commands for the first three-phase windings, and the voltages that are actually applied to the first three-phase windings.

Further, an error arises between the true rotational position of the AC rotating machine 1 and the rotational position estimated in accordance with an induced voltage scheme, in a case where an error arises between the first three-phase winding currents detected by the first current detector 2 and corresponding to the first three-phase windings, and the current actually flowing in the first three-phase windings.

Further, an error arises when between the true rotational position of the AC rotating machine 1 and the rotational position estimated in accordance with an induced voltage scheme, in a case where an error occurs between the set value of an electrical constant of the first three-phase windings and the actual electrical constant of the first three-phase windings.

In the control device of an AC rotating machine of the present Embodiment 1, therefore, a configuration is adopted wherein the rotational position is estimated on the basis of the dq axes voltage sums corresponding to the sums of the first three-phase voltage command and the second three-phase voltage command, and the dq axes current sums corresponding to the sums of first three-phase winding currents and the second three-phase winding currents. Such a configuration elicits an effect of averaging the influence of errors, with respect to the true physical quantity of the AC rotating machine 1, on a physical quantity such as electrical constant, voltage or current that is used in the induced voltage scheme. The error in the estimated rotational position can be reduced as a result.

Figure 4:
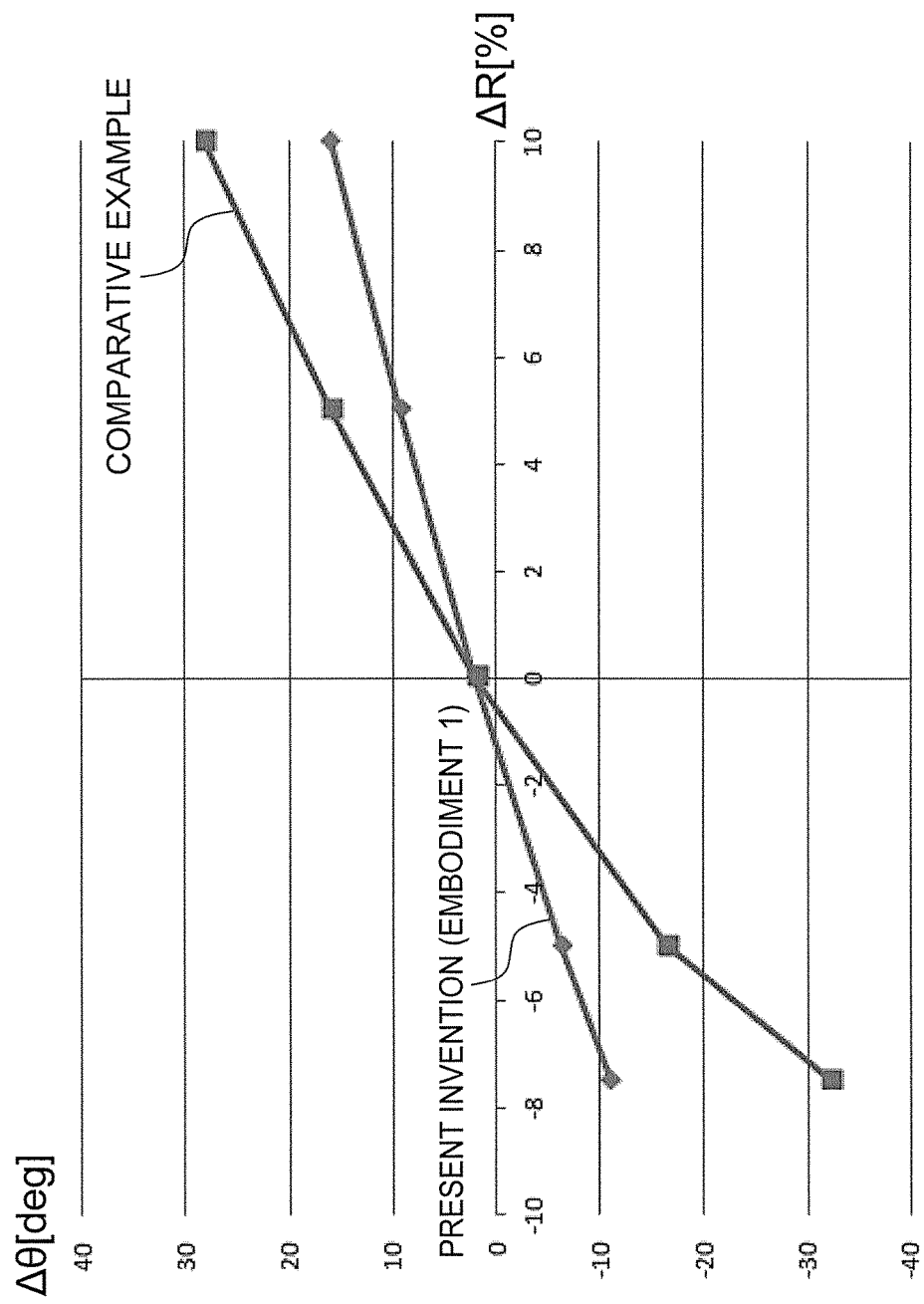
FIG. 4 is an explanatory diagram for comparing a rotational position estimated by the control device of an AC rotating machine in Embodiment 1 of the present invention and a rotational position estimated in accordance with a conventional induced voltage scheme.

The effect elicited by the control device of an AC rotating machine of the present Embodiment 1 will be further explained next with reference to FIG. 4. FIG. 4 is an explanatory diagram for comparing the rotational position estimated by the control device of an AC rotating machine in Embodiment 1 of the present invention and the rotational position estimated in accordance with a conventional induced voltage scheme.

FIG. 4 illustrates a simulation result of change in rotational position estimated by the control device of an AC rotating machine of the present Embodiment 1, in a case where the winding resistance R1 of the first three-phase windings is caused to vary with respect to the set value Rc of the winding resistance, being one electrical constant.

For the purpose of comparison, FIG. 4 illustrates also the simulation result of change in rotational position estimated in accordance with a conventional induced voltage scheme. As the conventional induced voltage scheme there is illustrated herein an instance where the rotational position is estimated according to Expression (1), on the basis of the first dq axes voltage commands and the first dq axes currents.

In FIG. 4, the horizontal axis represents a resistance error $\Delta R$ (%) given by the expression below, and the vertical axis represents the rotational position error $\Delta \theta$ (deg).

$$\Delta R = (R1 - Rc)/Rc \times 100$$

As illustrated in FIG. 4, the rotational position error $\Delta \theta$ is smaller with respect to resistance error $\Delta R$ in the control device of an AC rotating machine of the present Embodiment 1 than in the case in a conventional induced voltage scheme. Conceivable underlying reasons include the following.

In a case where an error x (%) occurs between the set value of the electrical constant of the first three-phase windings and the actual electric constant of the first three-phase windings, the rotational position estimator 17 is affected in proportion to the error x (%) when estimating the rotational position as the estimated rotational position $\theta$est.

The rotational position estimator 17, however, is configured to estimate the rotational position on the basis of the dq axes voltage sums corresponding to the sums of the first three-phase voltage command and the second three-phase voltage command, and the dq axes current sums corresponding to the sums of the first three-phase winding currents and the second three-phase winding currents. Therefore, the influence of an error x (%) occurring in the first three-phase windings is averaged between the first three-phase windings and the second three-phase windings. As a result, the influence of the error in the rotational position estimator 17 upon estimation of the rotational position as the estimated rotational position $\theta$est is reduced from an x (%) error fraction to an (x/2) (%) error fraction.

For the reasons above, the rotational position error $\Delta \theta$ is smaller with respect to the resistance error $\Delta R$ in the control device of an AC rotating machine of the present Embodiment 1 than in the case in a conventional induced voltage scheme.

The effect elicited herein, namely reduction of the rotational position error $\Delta \theta$ in the control device of an AC rotating machine of the present Embodiment 1 than in the case in a conventional induced voltage scheme, has been illustrated for an instance where an error arises between the set value Rc of winding resistance, being one electrical constant of the first three-phase windings, and the actual winding resistance R1 of the first three-phase windings. However, a similar effect is obtained also in the instances below.

Firstly, a similar effect is obtained also in a case where an error arises between a set value of an electrical constant other than winding resistance and the actual electrical constant, for the first three-phase windings and second three-phase windings.

Secondly, a similar effect is obtained also in a case where an error arises between the voltage commands calculated by the controller 6 as voltage commands for the first three-phase windings and the voltages actually applied to the first three-phase windings. Thirdly, a similar effect is obtained also in a case where an error arises between the voltage commands calculated by the controller 6 as voltage commands for the second three-phase windings and the voltages actually applied to the second three-phase windings.

Fourthly, a similar effect is achieved also in a case where an error arises between the first three-phase winding currents detected by the first current detector 2 corresponding to the first three-phase windings, and the current actually flowing in the first three-phase windings. Fifthly, a similar effect is achieved also in a case where an error arises between the second three-phase winding currents detected by the second current detector 3 corresponding to the second three-phase windings, and the current actually flowing in the second three-phase windings.

In the control device of an AC rotating machine of the present Embodiment 1 an effect is obtained thus of averaging the influence of an error, with respect to a true physical quantity of the AC rotating machine 1, in the physical quantity that is used in the induced voltage scheme. The error in the estimated rotational position can be reduced as a result.

As a comparative example, another conceivable instance may involve estimating the rotational position for each set of first three-phase windings and second three-phase windings, in accordance with a conventional induced voltage scheme, and taking an average value of the estimated rotational position for each set as the finally estimated rotational position.

In a conceivable instance, specifically, an average value of a rotational position $\theta$est1, being the rotational position estimated on the basis of a physical quantity corresponding to the first three-phase windings, and of $\theta$est2, being the rotational position estimated on the basis of a physical quantity corresponding to the second three-phase windings, is taken as the finally estimated rotational position. The average value is given by the expression below.

Average value=(θest1+θest2)/2

In this case it is necessary to calculate both the rotational position θest1 and the rotational position θest2, which entails a very large amount of computation. This is problematic in that, therefore, it is difficult to implement such a rotational position estimation function of the comparative example in an inexpensive microcomputer.

The control device of an AC rotating machine of the present Embodiment 1, by contrast, elicits an effect whereby a rotational position estimation function can be implemented also in an inexpensive microcomputer, while eliciting also the above-described effect, even without calculating both the rotational position θest1 and the rotational position θest2, relying on a configuration that involves just newly adding the voltage adder 15 and the current adder 16.

In the present Embodiment 1, thus, a configuration is adopted wherein a value resulting from adding two sets of d-axis voltage commands is calculated as a d-axis voltage sum, a value resulting from adding two sets of q-axis voltage commands is calculated as a q-axis voltage sum, a value resulting from adding two sets of d-axis currents is calculated as a d-axis current sum, and a value resulting from adding two sets of q-axis current is calculated as a q-axis current sum. The estimated rotational position is calculated on the basis of the d-axis voltage sum and the q-axis voltage sum, and on the basis of the d-axis current sum and the q-axis current sum.

To estimate the rotational position of the AC rotating machine having two sets of three-phase windings, there are used the dq axes voltage sums corresponding to the sums of the first three-phase voltage command and second three-phase voltage command, and the dq axes current sums corresponding to the sums of the first three-phase winding currents and second three-phase winding currents. An effect is achieved as a result of averaging the influence of error with respect to the true physical quantity of the AC rotating machine. As a result it becomes possible to estimate the rotational position with higher precision than in conventional cases.

Further, it is not necessary to execute a rotational position calculation for estimating the rotational position for each set, and hence there is no need for an increase in the number of rotational position estimators. Accordingly, the rotational position estimation function can be implemented in an inexpensive microcomputer.

In the present Embodiment 1 an instance has been illustrated where the invention of the present application is used in an AC rotating machine having first three-phase windings and second three-phase windings, as two sets of three-phase windings. However, the invention of the present application is not limited thereto, and can also be used in an AC rotating machine having three or more sets of three-phase windings. That is, the invention of the present application can be used in an AC rotating machine having N sets of three-phase windings, where N denotes a natural number equal to or greater than 2.

In a case where the invention of the present application is used in an AC rotating machine having N sets of three-phase windings, the control device of an AC rotating machine may be configured as follows.

Specifically, a configuration is adopted in which there are provided: a current detector that detects and outputs N sets of three-phase winding currents respectively flowing in N sets of three-phase windings; a controller that calculates and outputs N sets of three-phase voltage commands of respective N sets of three-phase windings, on the basis of a control command for the AC rotating machine and N sets of three-phase winding currents input from the current detector; and a power converter that applies AC voltage to the N sets of three-phase windings, on the basis of the input N sets of three-phase voltage commands.

The current coordinate converter calculates and outputs N sets of d-axis currents and N sets of q-axis currents respectively flowing in the N sets of three-phase windings by coordinate conversion, in two rotating axes, of the input N sets of three-phase winding currents, on the basis of the estimated rotational position θest. The current controller calculates and outputs the N sets of d-axis voltage commands and the N sets of q-axis voltage commands on the basis of the control command for the AC rotating machine and the input N sets of d-axis currents and N sets of q-axis currents.

The voltage coordinate converter calculates and outputs N sets of three-phase voltage commands by coordinate conversion, in two rotating axes, of the input N sets of d-axis voltage commands and N sets of q-axis voltage commands, on the basis of the estimated rotational position θest.

The voltage sum calculator calculates and outputs a d-axis voltage sum Vdsum from the input N sets of d-axis voltage commands, and calculates and outputs the q-axis voltage sum Vqsum from the input N sets of q-axis voltage commands. More specifically, the voltage sum calculator calculates, as the d-axis voltage sum Vdsum, a value resulting from adding the N sets of d-axis voltage commands, and calculates, as a q-axis voltage sum Vqsum, a value resulting from adding the N sets of q-axis voltage commands.

The current sum calculator calculates and outputs a d-axis current sum Idsum from the input N sets of d-axis currents, and calculates and outputs the q-axis current sum Iqsum from the input N sets of q-axis currents. More specifically, the current sum calculator calculates, as the d-axis current sum Idsum, a value resulting from adding the N sets of d-axis currents, and calculates and outputs, as a q-axis current sum Iqsum, a value resulting from adding the N sets of q-axis currents.

The rotational position estimator 17 calculates an estimated rotational position θest on the basis of the input d-axis voltage sum Vdsum and q-axis voltage sum Vqsum, and the input d-axis current sum Idsum and q-axis current sum Iqsum.

By configuring the control device of an AC rotating machine in this manner, an effect identical to the effect that is elicited by using the invention of the present application in the AC rotating machine 1 having two sets of three-phase windings, also in a case where the invention of the present application is used in an AC rotating machine having N sets of three-phase windings.

Specifically, it becomes possible to estimate the rotational position of an AC rotating machine having a plurality of sets of three-phase windings with higher precision than in conventional cases, and it becomes possible to easily implement a rotational position estimation function in an inexpensive microcomputer.

The method for estimating the rotational position is not limited to the method described in the present Embodiment 1, and the invention of the present application can be used also any scheme so long as the latter involves estimation on the basis of voltage commands, current and electrical constants of an AC rotating machine.

Embodiment 2

In Embodiment 2 of the present invention a configuration will be explained in which, in contrast to Embodiment 1 above, values resulting from doubling one set of voltage commands from among the first dq axes voltage commands and second dq axes voltage commands are calculated as the dq axes voltage sums. In the present Embodiment 2, features identical to those of Embodiment 1 above will not be explained, and the explanation will focus on features different from those of Embodiment 1.

Figure 5:
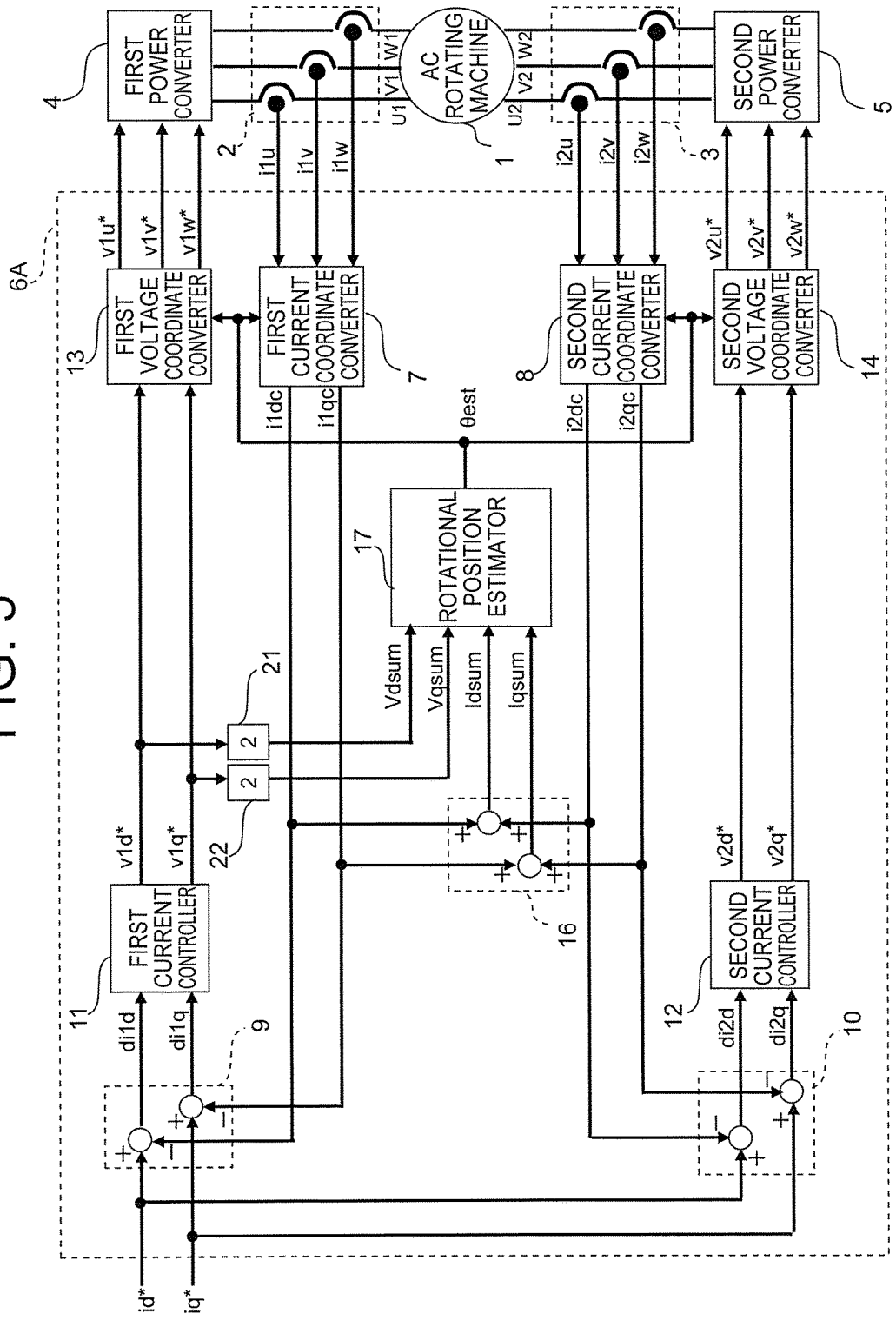
FIG. 5 is a configuration diagram illustrating the entirety of a control device of an AC rotating machine of Embodiment 2 of the present invention.

FIG. 5 is a configuration diagram illustrating the entirety of a control device of an AC rotating machine of Embodiment 2 of the present invention. As illustrated in FIG. 5, the control device of an AC rotating machine of the present Embodiment 2 is provided with the first current detector 2, the second current detector 3, the first power converter 4, the second power converter 5 and a controller 6A.

The controller 6A has the first current coordinate converter 7, the second current coordinate converter 8, the first current subtractor 9, the second current subtractor 10, the first current controller 11, the second current controller 12, the first voltage coordinate converter 13, the second voltage coordinate converter 14, the current adder 16, the rotational position estimator 17, a multiplier 21 and a multiplier 22. Compared with the controller 6, the controller 6A has the multiplier 21 and the multiplier 22 instead of the voltage adder 15, as a voltage sum calculator.

The multiplier 21 calculates, as the d-axis voltage sum Vdsum, a value resulting from doubling the first d-axis voltage command $v1d^*$ input from the first current controller 11, and outputs the calculated d-axis voltage sum Vdsum to the rotational position estimator 17.

The multiplier 22 calculates, as the q-axis voltage sum Vqsum, a value resulting from doubling the first q-axis voltage command $v1q^*$ input from the first current controller 11, and outputs the calculated q-axis voltage sum Vqsum to the rotational position estimator 17.

In the present Embodiment 2, thus, the calculation results of the multiplier 21 and the multiplier 22, instead of the calculation result of the voltage adder 15 in Embodiment 1 above, are input to the rotational position estimator 17.

The effect elicited by the control device of an AC rotating machine of the present Embodiment 2 will be explained next.

As described above, the first power converter 4 and the second power converter 5 apply AC voltage to the first three-phase windings and the second three-phase windings, respectively, in accordance with a PWM scheme or PAM scheme. In this case the first three-phase winding currents and second three-phase winding currents include harmonic components, for instance an integer multiple of a carrier frequency, besides a fundamental component for generating torque in the AC rotating machine 1.

When estimating the rotational position using the first three-phase winding currents or the second three-phase winding currents, therefore, the smaller the harmonic components included in the three-phase winding currents, the greater is the extent to which there can be reduced the harmonic components included in the estimated rotational position.

In the present Embodiment 2 the rotational position is estimated using the dq axes current sums corresponding to the sums of the first three-phase winding currents and second three-phase winding currents. Therefore, the content ratio of the harmonic components with respect to the fundamental wave component, in the sums of the first three-phase winding currents and second three-phase winding currents, is lower than in the first three-phase winding currents and second three-phase winding currents.

In the present Embodiment 2, thus, the rotational position is estimated using the dq axes current sums corresponding to the sums of the first three-phase winding currents and second three-phase winding currents, so as to reduce the influence of the harmonic components included in the estimated rotational position θest. Therefore, an effect is obtained similar to that of Embodiment 1 above, even when values resulting from doubling the first dq axes voltage commands are used as the dq axes voltage sums.

In the present Embodiment 2 an instance has been illustrated where values resulting from doubling the first dq axes voltage commands are calculated as the dq axes voltage sums. However, a configuration may be adopted wherein a value resulting from doubling the second d-axis voltage command $v2d^*$ is calculated as the d-axis voltage sum Vdsum, and a value resulting from doubling the second q-axis voltage command $v2q^*$ is calculated as the q-axis voltage sum Vqsum. Thus, a configuration may be adopted wherein a value resulting from doubling either one of the two sets of d-axis voltage commands is calculated as the d-axis voltage sum Vdsum, and a value resulting from doubling either one of the two sets of q-axis voltage commands is calculated as the q-axis voltage sum Vqsum.

In contrast with Embodiment 1 above, thus, in the configuration of the present Embodiment 2 a value resulting from doubling either one of the two sets of d-axis voltage commands is calculated as the d-axis voltage sum, and a value resulting from doubling either one of the two sets of q-axis voltage commands is calculated as the q-axis voltage sum. An effect similar to that of Embodiment 1 above is obtained as a result.

In a case where the invention of the present application is used in an AC rotating machine having N sets of three-phase windings, a configuration may be adopted, similarly to Embodiment 1 above, in which a voltage sum calculator calculates, as the d-axis voltage sum Vdsum, a value resulting from multiplying, by N, any one of the N sets of d-axis voltage commands and calculates, as the q-axis voltage sum Vqsum, and a value resulting from multiplying, by N, any one of the N sets of q-axis voltage commands.

Embodiment 3

In Embodiment 3 of the present invention a configuration will be explained in which, in contrast to Embodiment 1 above, values resulting from doubling one from among the first dq axes currents and second dq axes currents are calculated as the dq axes current sums. In the present Embodiment 3, features identical to those of Embodiment 1 above will not be explained, and the explanation will focus on features different from those of Embodiment 1.

Figure 6:
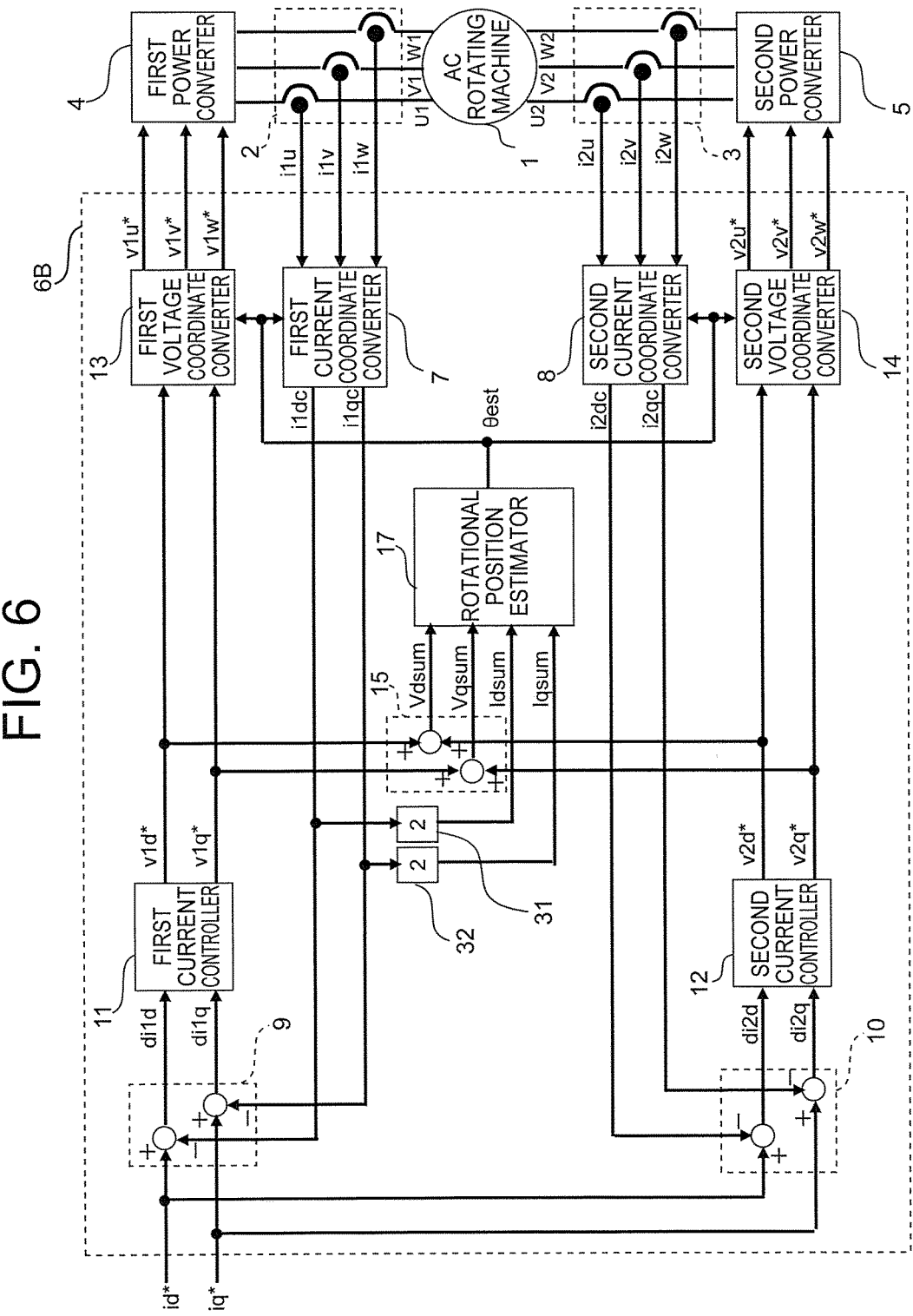
FIG. 6 is a configuration diagram illustrating the entirety of a control device of an AC rotating machine of Embodiment 3 of the present invention.

FIG. 6 is a configuration diagram illustrating the entirety of a control device of an AC rotating machine of Embodiment 3 of the present invention. As illustrated in FIG. 6, the control device of an AC rotating machine of the present Embodiment 3 is provided with the first current detector 2, the second current detector 3, the first power converter 4, the second power converter 5 and a controller 6B.

The controller 6B has the first current coordinate converter 7, the second current coordinate converter 8, the first current subtractor 9, the second current subtractor 10, the first current controller 11, the second current controller 12, the first voltage coordinate converter 13, the second voltage coordinate converter 14, the voltage adder 15, the rotational position estimator 17, a multiplier 31 and a multiplier 32. In contrast to the controller 6, the controller 6B has the multiplier 31 and the multiplier 32 instead of the current adder 16, as the current sum calculator.

The multiplier 31 calculates, as the d-axis current sum Idsum, a value resulting from doubling the first d-axis current i1dc input from the first current coordinate converter 7, and outputs the calculated d-axis current sum Idsum to the rotational position estimator 17.

The multiplier 32 calculates, as the q-axis current sum Iqsum, a value resulting from doubling the first q-axis current i1qc input from the first current coordinate converter 7, and outputs the calculated q-axis current sum Iqsum to the rotational position estimator 17.

In the present Embodiment 3, thus, the calculation results of the multiplier 31 and the multiplier 32, instead of the calculation result of the current adder 16 in Embodiment 1 above, are input to the rotational position estimator 17.

The effect elicited by the control device of an AC rotating machine of the present Embodiment 3 will be explained next.

In a case where the current followability of the first current controller 11 and the second current controller 12 is high, control is performed herein so that the first d-axis current i1dc and the second d-axis current i2dc substantially match the d-axis current command id*, and the first q-axis current i1qc and the second q-axis current i2qc substantially match the q-axis current command iq*. In this case, the first d-axis current i1dc and the second d-axis current i2dc roughly match each other and the first q-axis current i1qc and the second q-axis current i2qc roughly match each other.

Therefore, the influence of the error of electrical constants of the AC rotating machine 1 explained in Embodiment 1 above appears as an error occurring between the voltage command calculated by the controller 6B as the voltage command for the first three-phase windings and the voltage that is actually applied to the first three-phase windings, or, alternatively, as an error occurring between the voltage command calculated by the controller 6B as a voltage command for the second three-phase windings and the voltage that is actually applied to the second three-phase windings.

In the present Embodiment 3 the rotational position is estimated using the dq axes voltage sums corresponding to the sums of the first three-phase voltage command and second three-phase voltage command, in such a manner that the influence of such a voltage error is averaged. Therefore, an effect is elicited identical to that of Embodiment 1 above, also when a value resulting from doubling the first dq axes currents is used as the dq axes current sums.

In the present Embodiment 3, an instance has been illustrated where values resulting from doubling first dq axes currents are calculated as the dq axes current sums. However, a configuration may be adopted wherein a value resulting from doubling the second d-axis current i2dc is calculated as the d-axis current sum Idsum, and a value resulting from doubling the second q-axis current i2qc is calculated as the q-axis current sum Iqsum. Also a configuration may be adopted wherein a value resulting from doubling either one of the two sets of d-axis currents is calculated as the d-axis current sum Idsum and a value resulting from doubling either one of the two sets of q-axis current is calculated as the q-axis current sum Iqsum.

In contrast with Embodiment 1 above, thus, in the configuration of the present Embodiment 3 a value resulting from doubling either one of the two sets of d-axis currents is calculated as the d-axis current sum and a value resulting from doubling either one of the two sets of q-axis currents is calculated as the q-axis current sum. An effect similar to that of Embodiment 1 above is obtained as a result.

In a case where the invention of the present application is used in an AC rotating machine having N sets of three-phase windings, a configuration may be adopted, similarly to Embodiment 1 above, in which a current sum calculator calculates, as the d-axis current sum Idsum, a value resulting from multiplying, by N, any one of the N sets of d-axis currents, and calculates, as the q-axis current sum Iqsum, a value resulting from multiplying, by N, any one of the N sets of q-axis currents.

Embodiment 4

In contrast to Embodiment 1 above, In Embodiment 4 of the present invention, an instance will be explained in which the phase of the first three-phase voltage command and the phase of the second three-phase voltage command are shifted from each other. In the present Embodiment 4, features identical to those of Embodiment 1 above will not be explained, and the explanation will focus on features different from those of Embodiment 1.

Figure 7:
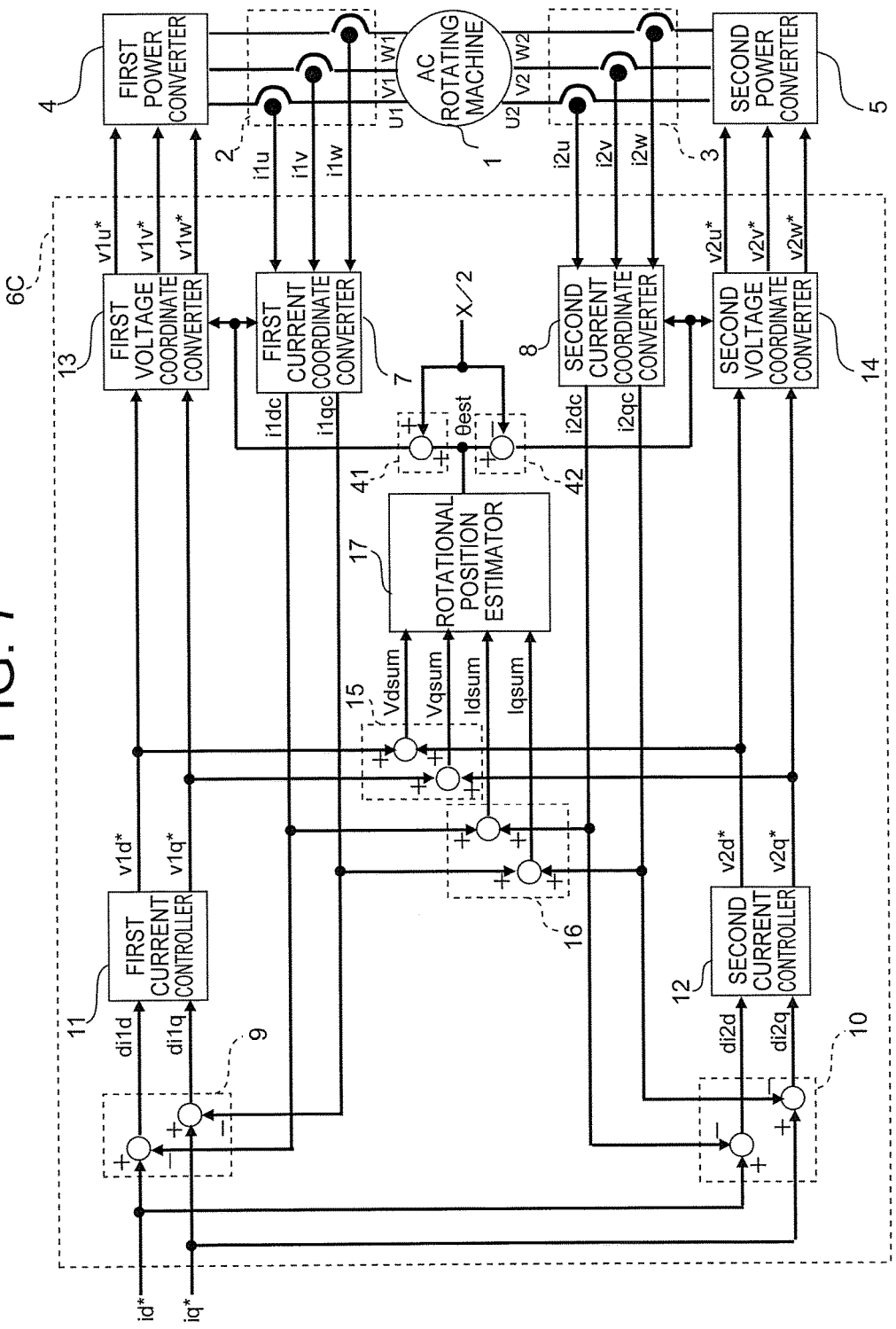
FIG. 7 is a configuration diagram illustrating the entirety of a control device of an AC rotating machine of Embodiment 4 of the present invention.

FIG. 7 is a configuration diagram illustrating the entirety of a control device of an AC rotating machine of Embodiment 4 of the present invention. As illustrated in FIG. 7, the control device of an AC rotating machine of the present Embodiment 4 is provided with the first current detector 2, the second current detector 3, the first power converter 4, the second power converter 5 and a controller 6C.

The controller 6C has the first current coordinate converter 7, the second current coordinate converter 8, the first current subtractor 9, the second current subtractor 10, the first current controller 11, the second current controller 12, the first voltage coordinate converter 13, the second voltage coordinate converter 14, the voltage adder 15, the current adder 16 the rotational position estimator 17, an adder 41 and a subtractor 42. In contrast to the controller 6, the controller 6C further has the adder 41 and the subtractor 42.

The adder 41 calculates, as an estimated rotational position θest', a value resulting from adding X/2 and the estimated rotational position θest input from the rotational position estimator 17, and outputs the calculated estimated rotational position θest' to the first current coordinate converter 7 and the first voltage coordinate converter 13. The estimated rotational position θest' is given by the expression below.

$$\theta est' = \theta est + (X/2)$$

The subtractor 42 calculates, as an estimated rotational position θest" a value obtained by subtracting X/2 from the estimated rotational position θest input from the rotational position estimator 17, and outputs the calculated estimated rotational position θest" to the second current coordinate converter 8 and the second voltage coordinate converter 14. The estimated rotational position θest" is given by the expression below.

$$\theta est'' = \theta est - (X/2)$$

Herein X can be given by the expression below, where n is a natural number equal to or greater than 4.

$$X = 180/n$$

Unlike the configuration of Embodiment 1 above, with the adder 41 and the subtractor 42 being provided further, the first three-phase voltage command and the first three-phase winding currents are coordinate-converted using the estimated rotational position θest', and the second three-phase voltage command and second three-phase winding currents are coordinate-converted using the estimated rotational position θest".

Therefore, a phase difference of X degrees arises between the first three-phase voltage command and the second three-phase voltage command. Specifically, the phases of the first three-phase voltage command and the second three-phase voltage command are shifted by X degrees. Similarly, a phase difference of X degrees arises between the first three-phase winding currents and the second three-phase winding currents.

Examples of the numerical value of X include for instance X=30 degrees, which will be used in the explanation that follows. In a case where X=30 degrees there holds n=6.

In Embodiments 1 to 3, as described above, the first power converter 4 and the second power converter 5 apply voltage to the first three-phase windings and the second three-phase windings, respectively, in accordance with a PWM scheme or PAM scheme.

In a case where an inverter is used as the first power converter 4 and the second power converter 5, it is necessary to provide a dead time so as to prevent simultaneous turning-on of a power device disposed on the positive electrode side of a DC bus bar and a power device disposed on the negative electrode side.

Similarly, in a case where a matrix converter is used as the first power converter 4 and the second power converter 5, a dead time must be provided so as not to short-circuit, with a system side, a power device that is connected to system-side three phases, for each of the first three-phase windings and second three-phase windings.

As is known, in a configuration where a dead time is thus provided, the voltage that is applied to the first three-phase windings and second three-phase windings, and the current that is applied to the first three-phase windings and second three-phase windings, are distorted by the dead time. Numerous techniques are known as methods for correcting this distortion.

When estimating the rotational position on the basis of currents or voltage commands that are distorted by the dead time, the estimated rotational position is also influenced by the distortion, and the driving performance of the AC rotating machine 1 is reduced as a result.

In Embodiments 1 to 3, an error averaging effect is obtained, and the influence of dead time can be reduced, by adopting a configuration in which rotational position is estimated on the basis of the dq axes voltage sums and the dq axes current sums. However the first three-phase voltage command and second three-phase voltage command and the first three-phase winding currents and second three-phase winding currents, respectively, are substantially in phase. Therefore, the influence of dead time can be sufficiently eliminated through simultaneous zero crossing of the foregoing.

In the present Embodiment 4, accordingly, the phase of the first three-phase voltage command and of the second three-phase voltage command are shifted by 30 degrees, as a result of which the dq axes voltage sums and the dq axes current sums are calculated with zero-crossing timings that are shifted by 30 degrees. By virtue of this configuration, it becomes possible to reduce the content of distortion component with respect to the fundamental wave component, in voltage commands and in currents. The rotational position can be estimated with higher precision as a result.

Figure 8:
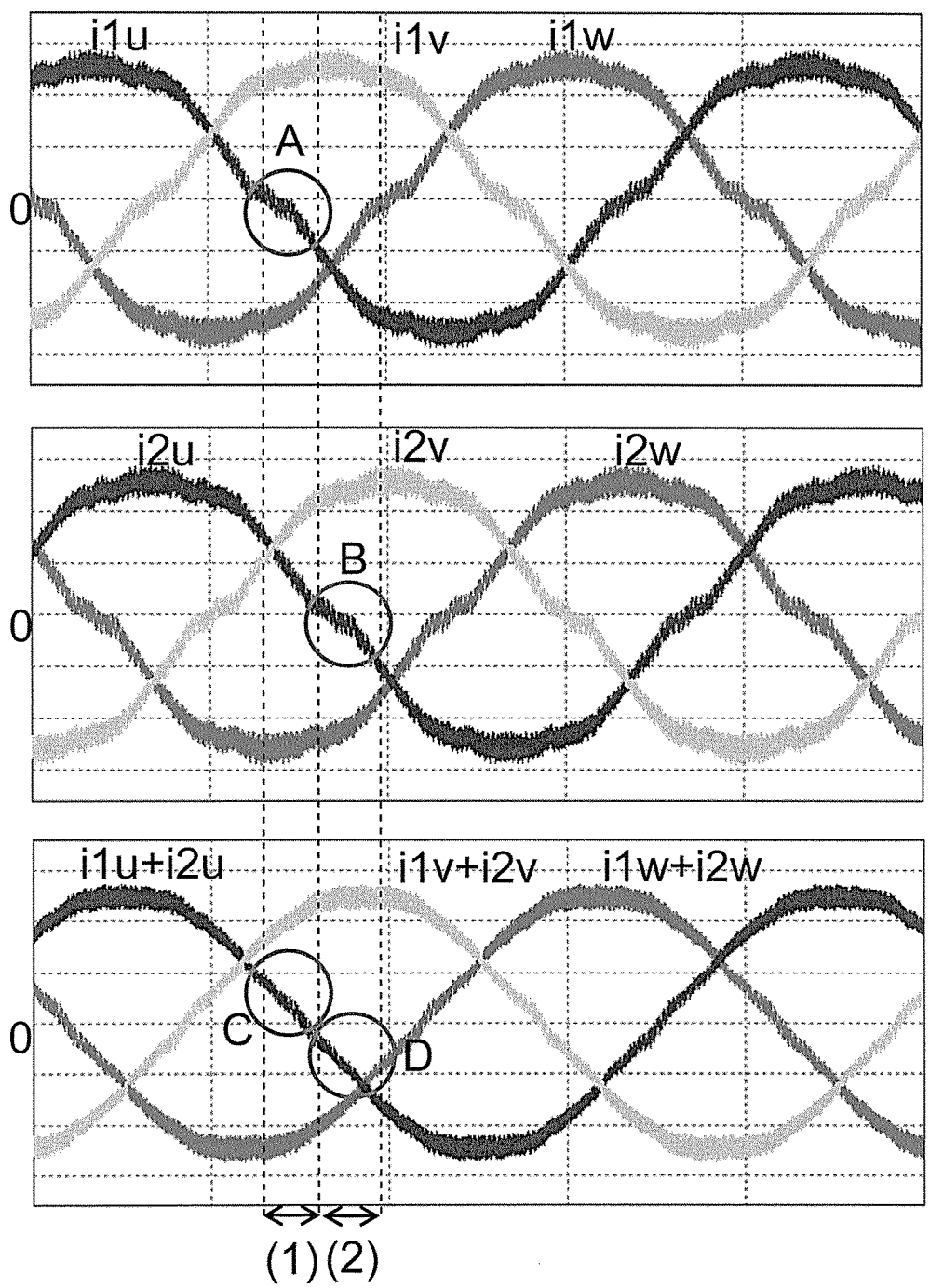
FIG. 8 is a set of waveform diagrams illustrating first three-phase winding currents, second three-phase winding currents and respective sums of the first three-phase winding currents and second three-phase winding currents, in Embodiment 4 of the present invention, in a case where the phases of a first three-phase voltage command and a second three-phase voltage command are shifted by 30 degrees.

FIG. 8 is a set of waveform diagrams illustrating first three-phase winding currents, second three-phase winding currents and the sums of the first three-phase winding currents and second three-phase winding currents, in Embodiment 4 of the present invention, in a case where the phases of the first three-phase voltage command and of the second three-phase voltage command are shifted by 30 degrees. The sums of the first three-phase winding currents and second three-phase winding currents correspond to the dq axes current sums.

Focusing in the first three-phase winding currents, FIG. 8 reveals that waveforms are distorted in the vicinity of zero crossing. For instance, the waveforms are distorted in A of section (1) in the figure.

Focusing now on the second three-phase winding currents, FIG. 8 reveals that waveforms are likewise distorted in the vicinity of zero crossing. For instance, the waveforms are distorted in B of section (2) in the figure.

The content ratio of 5-th order component with respect to the fundamental wave component in the first three-phase winding currents and second three-phase winding currents is 4.75%. As can be seen in A of section (1) and B of section (2), the distortion of the waveforms is shifted by 30 degrees as a result of setting to 30 degrees the phase difference between the first three-phase voltage command and the second three-phase voltage command. Distortion in the vicinity of zero crossing caused by dead time improves in C of section (1) and D of section (2), for the sums of the first three-phase winding currents and second three-phase winding currents.

The content ratio of 5-th order component with respect to the fundamental wave component in the sums of the first three-phase winding currents and second three-phase winding currents is 1.25%, i.e. the content ratio drops to ⅓ of the 4.75% described above. Specifically, the influence of distortion caused by the dead time, and included in the first three-phase winding currents and second three-phase winding currents, is mitigated by addition of the first three-phase winding currents and second three-phase winding currents. Similarly, influence of distortion caused by dead time, in the first three-phase voltage command and second three-phase voltage command, is similarly mitigated by addition of the first three-phase voltage command and second three-phase voltage command.

The content of the dead time-derived distortion component included in the dq axes voltage sums and the dq axes current sums, with respect to the fundamental wave component, can be reduced by calculating the dq axes voltage sums and the dq axes current sums upon a 30-degree shift of the phases of the first three-phase voltage command and of the second three-phase voltage command. The rotational position can be estimated with higher precision as a result.

In the present Embodiment 4 an instance has been illustrated where X=30 degrees, but a similar effect is achieved if X=(180/n) degrees, since section (1) and section (2) in FIG. 8 are then shifted.

In contrast to Embodiment 1 above, in the present Embodiment 4 an instance has been illustrated where the phase of the first three-phase voltage command and the phase of the second three-phase voltage command are shifted by (180/n) degrees. However, a similar effect can be elicited by prescribing a shift of (180/n) degrees of the phase of the first three-phase voltage command and of the phase of the second three-phase voltage command in the configurations of Embodiments 2 and 3.

In contrast to Embodiments 1 to 3, thus, in the present Embodiment 4, the phase of the first three-phase voltage command and of the phase of the second three-phase voltage command are set to be shifted by (180/n) degrees. As a result, it becomes possible to reduce the content of the dead time-derived distortion component, included in the dq axes voltage sums and the dq axes current sums, with respect to the fundamental wave component. The rotational position can be estimated with higher precision as a result.

Embodiment 5

In contrast to Embodiment 1 above, in Embodiment 5 of the present invention an instance will be explained in which an AC rotating machine 1A, instead of the AC rotating machine 1, is now the control target. In the present Embodiment 5, features identical to those of Embodiment 1 above will not be explained, and the explanation will focus on features different from those of Embodiment 1.

Figure 9:
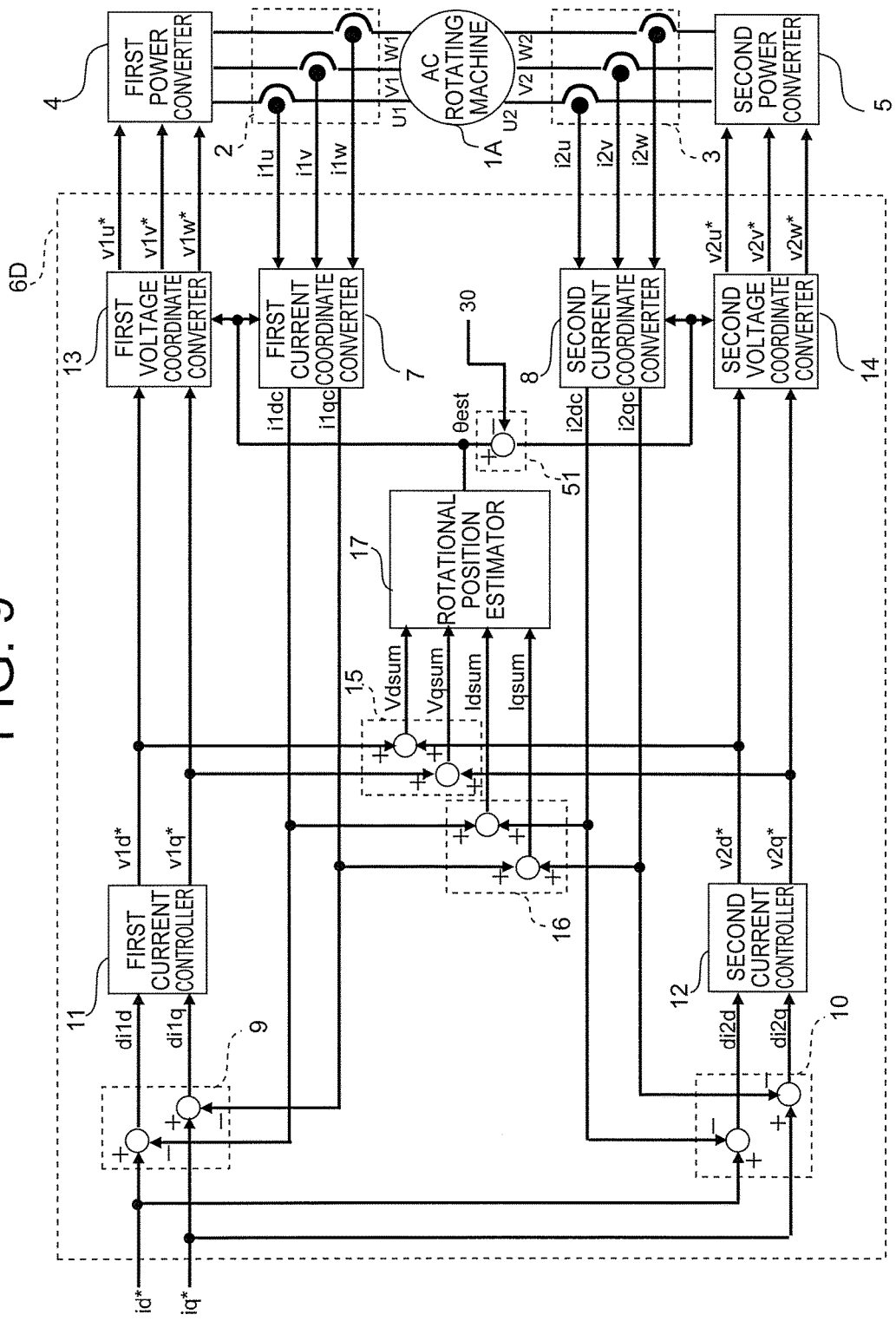
FIG. 9 is a configuration diagram illustrating the entirety of a control device of an AC rotating machine of Embodiment 5 of the present invention.

FIG. 9 is a configuration diagram illustrating the entirety of a control device of an AC rotating machine of Embodiment 5 of the present invention. As illustrated in FIG. 9, the control device of an AC rotating machine of the present Embodiment 5 is provided with the first current detector 2, the second current detector 3, the first power converter 4, the second power converter 5 and a controller 6D. The control target of the control device of an AC rotating machine of the present Embodiment 5 is an AC rotating machine 1A instead of the AC rotating machine 1.

The controller 6D has the first current coordinate converter 7, the second current coordinate converter 8, the first current subtractor 9, the second current subtractor 10, the first current controller 11, the second current controller 12, the first voltage coordinate converter 13, the second voltage coordinate converter 14, the voltage adder 15, the current adder 16 the rotational position estimator 17, and a subtractor 51. In contrast to the controller 6, the controller 6D further has the subtractor 51.

The subtractor 51 calculates, as an estimated rotational position θest''', a value obtained by subtracting X from the estimated rotational position θest that is input from the rotational position estimator 17, and outputs the calculated estimated rotational position θest''' to the second current coordinate converter 8 and the second voltage coordinate converter 14. The estimated rotational position θest''' is given by the expression below. An instance of X=30 degrees is illustrated herein, as depicted in FIG. 9.

θest'''=θest−X

Herein X can be given by the expression below, where n is a natural number equal to or greater than 4.

X=180/n

Figure 10:
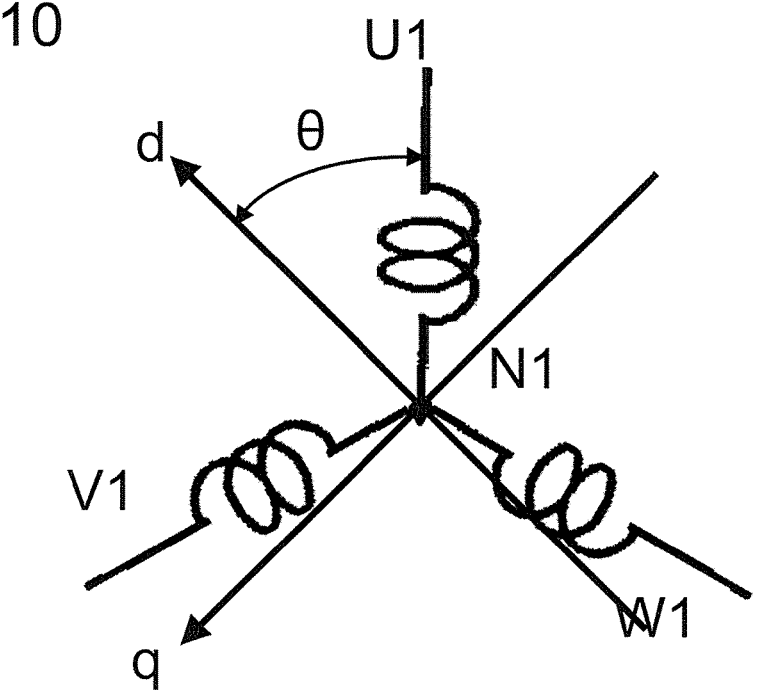
FIG. 10 is a configuration diagram illustrating first three-phase windings of the AC rotating machine of FIG. 9.
Figure 11:
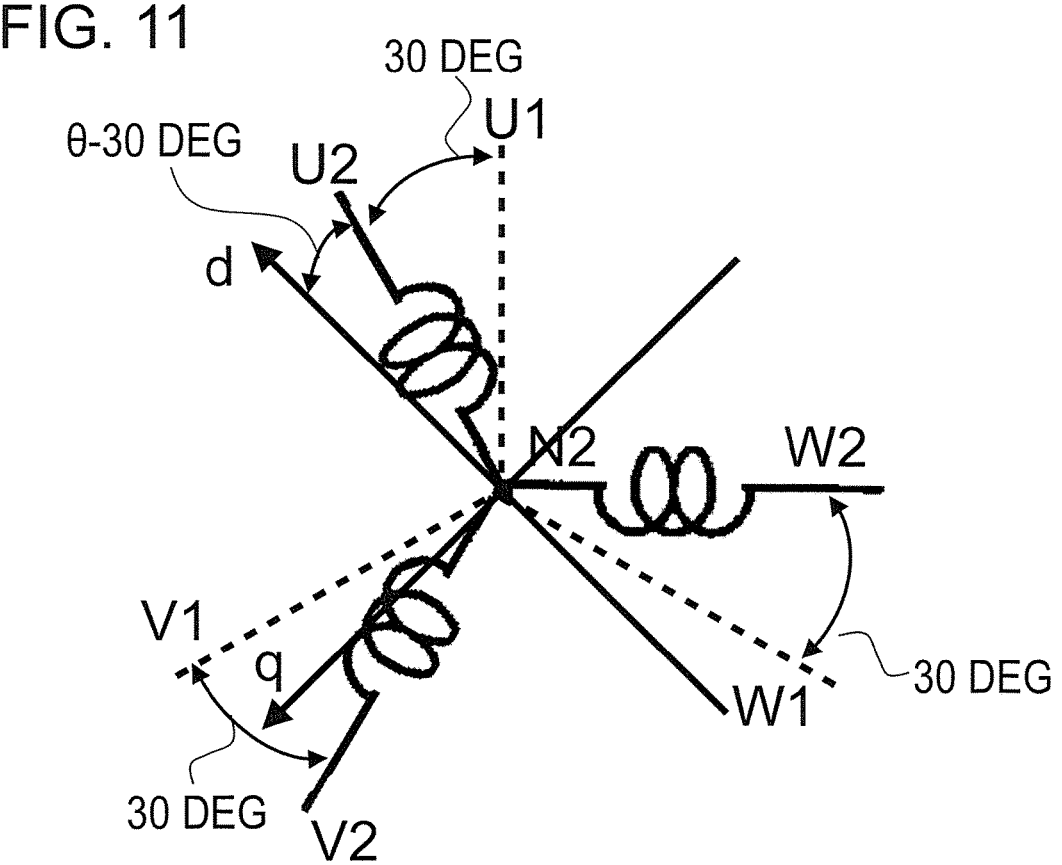
FIG. 11 is a configuration diagram illustrating second three-phase windings of the AC rotating machine of FIG. 9.

The AC rotating machine 1A will be explained next with reference to FIG. 10 to FIG. 16. FIG. 10 is a configuration diagram illustrating first three-phase windings of the AC rotating machine 1A of FIG. 9. FIG. 11 is a configuration diagram illustrating second three-phase windings of the AC rotating machine 1A of FIG. 9.

Figure 12:
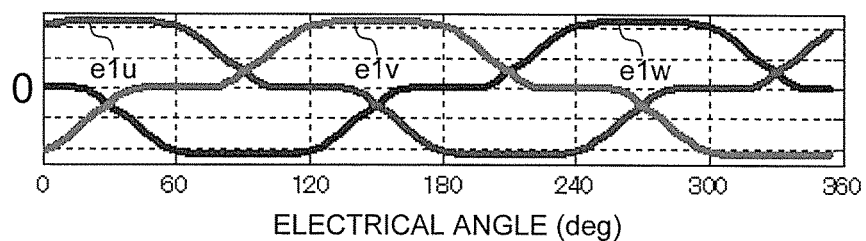
FIG. 12 is a set of waveform diagrams illustrating first three-phase induced voltages that are induced in the first three-phase windings of the AC rotating machine of FIG. 9.
Figure 13:
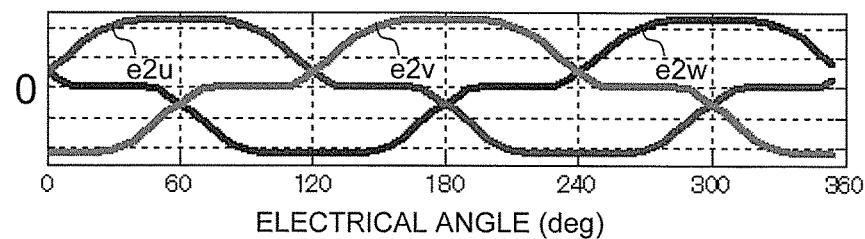
FIG. 13 is a set of waveform diagrams illustrating second three-phase induced voltages that are induced in the second three-phase windings of the AC rotating machine of FIG. 9.

FIG. 12 is a set of waveform diagrams illustrating first three-phase induced voltages that are induced in the first three-phase windings of the AC rotating machine 1A of FIG. 9. FIG. 13 is a set of waveform diagrams illustrating second three-phase induced voltages that are induced in the second three-phase windings of the AC rotating machine 1A of FIG. 9.

Figure 14:
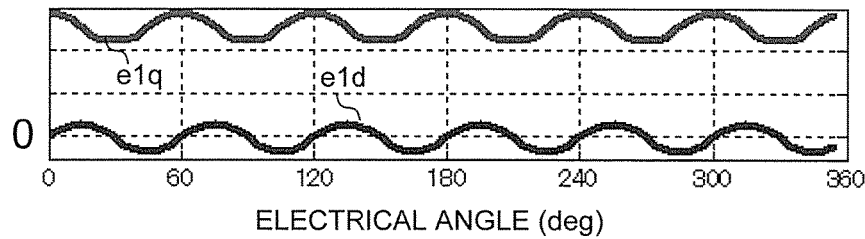
FIG. 14 is a set of waveform diagrams illustrating first dq axes induced voltages in two rotating axes, resulting from coordinate conversion of the first three-phase induced voltages of FIG. 12 to d-q axes.
Figure 15:
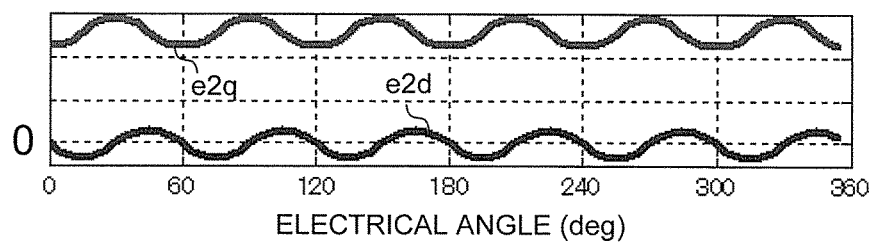
FIG. 15 is a set of waveform diagrams illustrating second dq axes induced voltages in two rotating axes, resulting from coordinate conversion of the second three-phase induced voltages of FIG. 13 to d-q axes.
Figure 16:
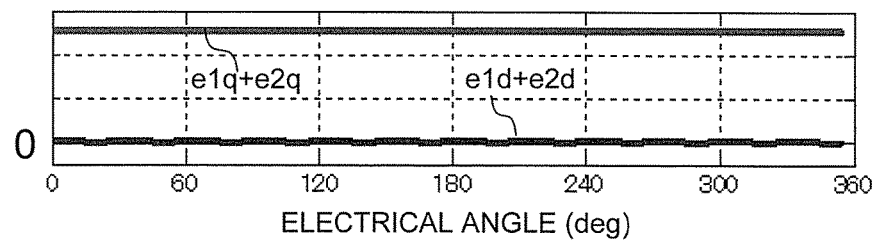
FIG. 16 is a set of waveform diagrams illustrating dq axes induced voltage sums being the sums of the first dq axes induced voltages of FIG. 14 and the second dq axes induced voltages of FIG. 15.

FIG. 14 is a set of waveform diagrams illustrating first dq axes induced voltages in two rotating axes, resulting from coordinate conversion of the first three-phase induced voltages of FIG. 12 to d-q axes. FIG. 15 is a set of waveform diagrams illustrating second dq axes induced voltages in two rotating axes, resulting from coordinate conversion of the second three-phase induced voltages of FIG. 13 to d-q axes. FIG. 16 is a set of waveform diagrams illustrating a dq axes induced voltage sums being the sums of the first dq axes induced voltages of FIG. 14 and the second dq axes induced voltages of FIG. 15. FIG. 12 to FIG. 16 illustrate waveforms for one electrical angle period.

The AC rotating machine 1A is a permanent magnet synchronous rotating machine and has two sets of three-phase windings, i.e. first three-phase windings and second three-phase windings. Specifically, the AC rotating machine 1A has first three-phase windings made up of a U-phase winding U1, a V-phase winding V1 and a W-phase winding W1, and second three-phase windings made up of a U-phase winding U2, a V-phase winding V2 and a W-phase winding W2. The AC rotating machine 1A has a rotor (not shown) configured so that field magnetic flux is generated by permanent magnets or by field system windings.

In the first three-phase windings and the second three-phase windings, the U1 phase and the U2 phase, the V1 phase and the V2 phase, and the W1 phase and the W2 phase are all disposed at phase differences corresponding to an electrical angle of 30 degrees, as illustrated in FIG. 10 and FIG. 11. Defining as the d-axis the direction of magnetic flux generated by the rotor of the AC rotating machine 1A, and defining as the q-axis a direction advanced from the d-axis by an electrical angle of 90 degrees, the angle formed by the U-phase winding U1 and the d-axis is θ degrees and the angle formed by the U-phase winding U2 and the d-axis is (θ-30) degrees.

In FIG. 12, the first three-phase induced voltages are made up of a U-phase induced voltage e1u induced in the U-phase winding U1, a V-phase induced voltage e1v induced in the V-phase winding V1 and a W-phase induced voltage e1w induced in the W-phase winding W1. In FIG. 13, the second three-phase induced voltages are made up of a U-phase induced voltage e2u induced in the U-phase winding U2, a V-phase induced voltage e2v induced in the V-phase winding V2 and a W-phase induced voltage e2w induced in the W-phase winding W2.

In addition to a fundamental wave component the period of which is equal to one electrical angle period, the first three-phase induced voltages and the second three-phase induced voltages include a 5-th order component the period of which is equal to ⅕ of the electrical angle period and a 7-th order component the period of which is equal to ⅐ of the electrical angle period.

In FIG. 14, the first dq axes induced voltages are made up of a first d-axis induced voltage e1d and a first q-axis induced voltage e1q. In FIG. 15, the second dq axes induced voltages are made up of a second d-axis induced voltage e2d and a second q-axis induced voltage e2q.

For the first three-phase induced voltages, the fundamental wave component is converted to a DC component and the 5-th order component and the 7-th order component are converted to a 6-th order component, at the first dq axes induced voltages in the two rotating axes. Similarly, for the second three-phase induced voltages, the fundamental wave component is converted to a DC component, and the 5-th order component and the 7-th order component are converted to a 6-th order component, at the second dq axes induced voltages in the two rotating axes.

The phase differences in the first three-phase windings and the second three-phase windings are 30 degrees, and hence the fundamental wave component has a phase difference of 30 degrees, and the 6-th order component a phase difference of 180 (=30×6) degrees. Further, the 6-th order component of the first dq axes induced voltages and the 6-th order component of the second dq axes induced voltages exhibit an opposite phase relationship with respect to each other.

Herein, the dq axes induced voltage sums are made up of a d-axis induced voltage sum being the sum of the first d-axis induced voltage e1$d$ and the second d-axis induced voltage e2$d$, and a q-axis induced voltage sum being the sum of the first q-axis induced voltage e1$q$ and the second q-axis induced voltage e2$q$. The d-axis induced voltage sum and the q-axis induced voltage sum are given by the expressions below.

$d$-axis induced voltage sum=$e1d+e2d$ $q$-axis induced voltage sum=$e1q+e2q$

As FIG. 16 reveals, the 6-th order component of the first dq axes induced voltages and the 6-th order component of the second dq axes induced voltages are cancelled, and hence substantially only the DC component is present in the dq axes induced voltage sums.

Thus, at least one from among the first dq axes currents and the first dq axes voltage commands undergoes distortion at the 6-th order component, due to the fact that the first dq axes induced voltages in the two rotating axes exhibit 6-th order fluctuation. Which one from among the first dq axes currents and the first dq axes voltage commands includes a 6-th order component to a greater extent depends herein on the performance of the first current controller 11.

As a first example, specifically, the first dq axes currents follow the dq axes current commands in a case where the current followability of the first current controller 11 is high. Therefore, the first dq axes voltage commands include as a result the 6-th order component to a greater extent. As a second example, by contrast, the first dq axes voltage commands cannot follow the 6-th order component in a case where the current followability of the first current controller 11 is low, and accordingly the first dq axes currents include the 6-th order component to a greater extent. Both the first dq axes voltage commands and the first dq axes currents include a 6-th order component in a case where the current followability of the first current controller 11 exhibits a performance intermediate between that of the first example and second example above.

Similarly, the second dq axes voltage commands and second dq axes currents include a 6-th order component in accordance with the performance of the second current controller 12.

In a conventional induced voltage scheme, therefore, a 6-th order component is included at the estimated rotational position in a case where the rotational position is estimated on the basis of a physical quantity relating to the first three-phase windings or to the second three-phase windings.

In the present Embodiment 5, by contrast, the 6-th order component is cancelled by the dq axes induced voltage sums, and hence 6-th order components are all cancelled in the dq axes voltage sums and the dq axes current sums. Therefore, it becomes possible to estimate the rotational position on the basis of the voltage commands and the DC component of currents, and hence higher estimation precision can be achieved while reducing the impact of the 6-th order component.

In the present Embodiment 5, thus, the invention is used in a AC rotating machine 1A configured so that there is a phase difference of 30 degrees between the first three-phase windings and the second three-phase windings, and wherein, as a result of rotation, the voltage induced in the first three-phase windings and the second three-phase windings includes a 5-th order component and a 7-th order component. Specifically a rotational position estimation scheme of the present invention based on dq axes voltage sums and dq axes current sums is used in such an AC rotating machine 1A. As a result it becomes possible to reduce the 6-th order component pulsation included in the estimated rotational position.

In the present Embodiment 5, an instance has been illustrated where the invention of the present application is used in an AC rotating machine 1A in which first three-phase induced voltages and second three-phase induced voltages include a 5-th order component and a 7-th order component. However, the invention of the present application can be used also in an AC rotating machine in which the first three-phase induced voltages and the second three-phase induced voltages include an (n×m±1)-th component. Herein m is a natural number.

In contrast with the configuration of Embodiment 1 above, in the present Embodiment 5 an instance has been illustrated where the control target is the AC rotating machine 1A instead of the AC rotating machine 1. However, an effect of reducing 6-th order component pulsation included in the estimated rotational position is achieved also in a configuration that involves estimating the rotational position using either the dq axes voltage sums or the dq axes current sums, and hence the AC rotating machine 1A may serve herein as the control target, instead of the AC rotating machine 1, in the configurations of Embodiments 2 and 3 above.

By virtue of the present Embodiment 5, thus, the invention of the present application is used in an AC rotating machine having a phase difference of (180/n) degrees between the first three-phase windings and the second three-phase windings, and in which first three-phase induced voltages that are induced in the first three-phase windings and second three-phase induced voltages that are induced in the second three-phase windings include a (n×m±1)-th order component, as a result of rotation of the machine. It becomes possible accordingly to reduce high-order component pulsation included in the estimated rotational position.

Embodiment 6

In contrast to Embodiment 1 above, in Embodiment 6 of the present invention an instance will be explained in which an AC rotating machine 1B is the control target, instead of the AC rotating machine 1. In the present Embodiment 6, features identical to those of Embodiment 1 above will not be explained, and the explanation will focus on features different from those of Embodiment 1.

Figure 17:
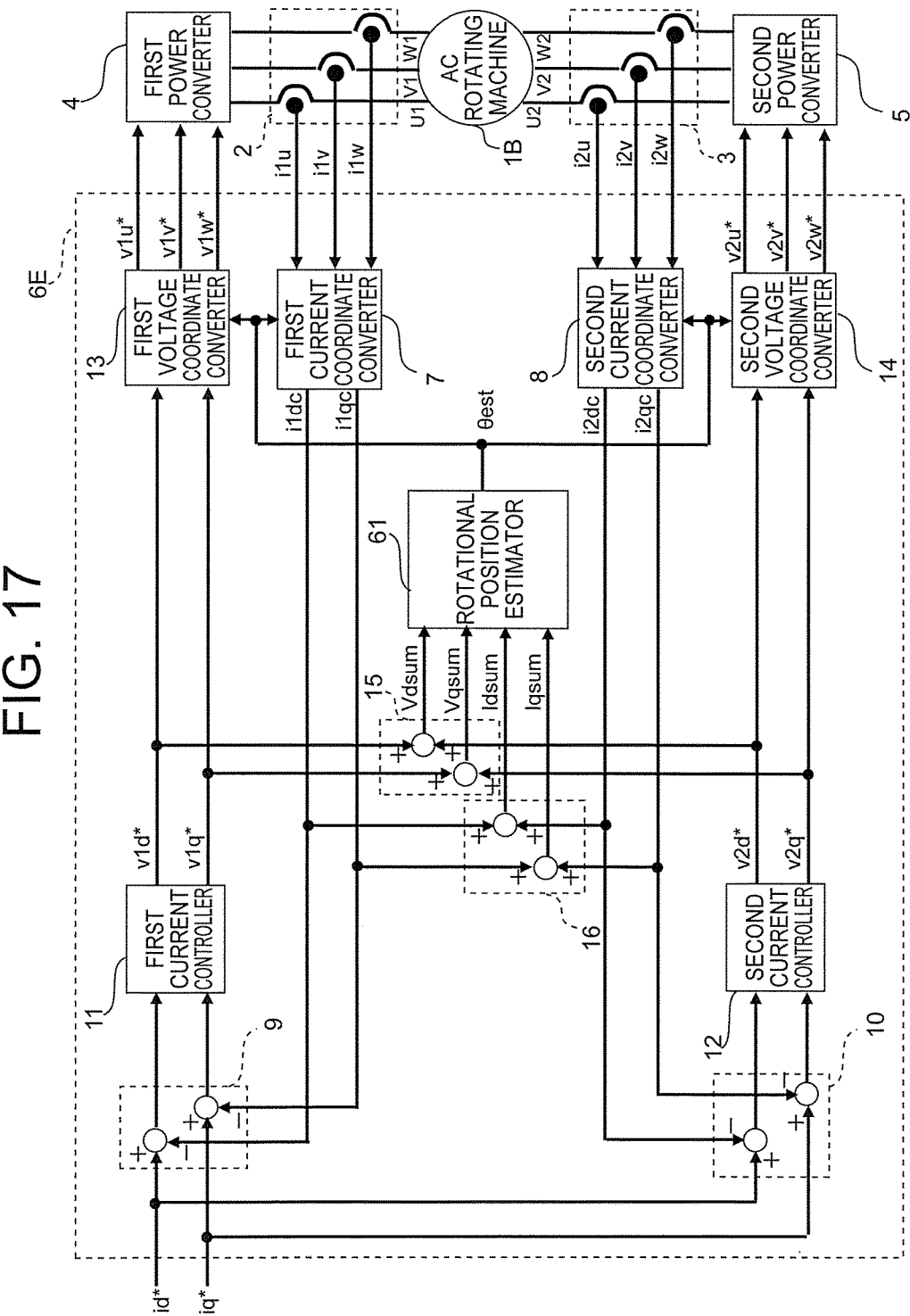
FIG. 17 is a configuration diagram illustrating the entirety of a control device of an AC rotating machine of Embodiment 6 of the present invention.

FIG. 17 is a configuration diagram illustrating the entirety of a control device of an AC rotating machine of Embodiment 6 of the present invention. As illustrated in FIG. 17, the control device of an AC rotating machine of the present Embodiment 6 is provided with the first current detector 2, the second current detector 3, the first power converter 4, the second power converter 5 and a controller 6E. The control target of the control device of an AC rotating machine of the present Embodiment 6 is an AC rotating machine 1B instead of the AC rotating machine 1.

The controller 6E has the first current coordinate converter 7, the second current coordinate converter 8, the first current subtractor 9, the second current subtractor 10, the first current controller 11, the second current controller 12, the first voltage coordinate converter 13, the second voltage coordinate converter 14, the voltage adder 15, the current adder 16 and a rotational position estimator 61. In contrast to the controller 6, the controller 6E further has the rotational position estimator 61 different from the rotational position estimator 17.

Figure 18:
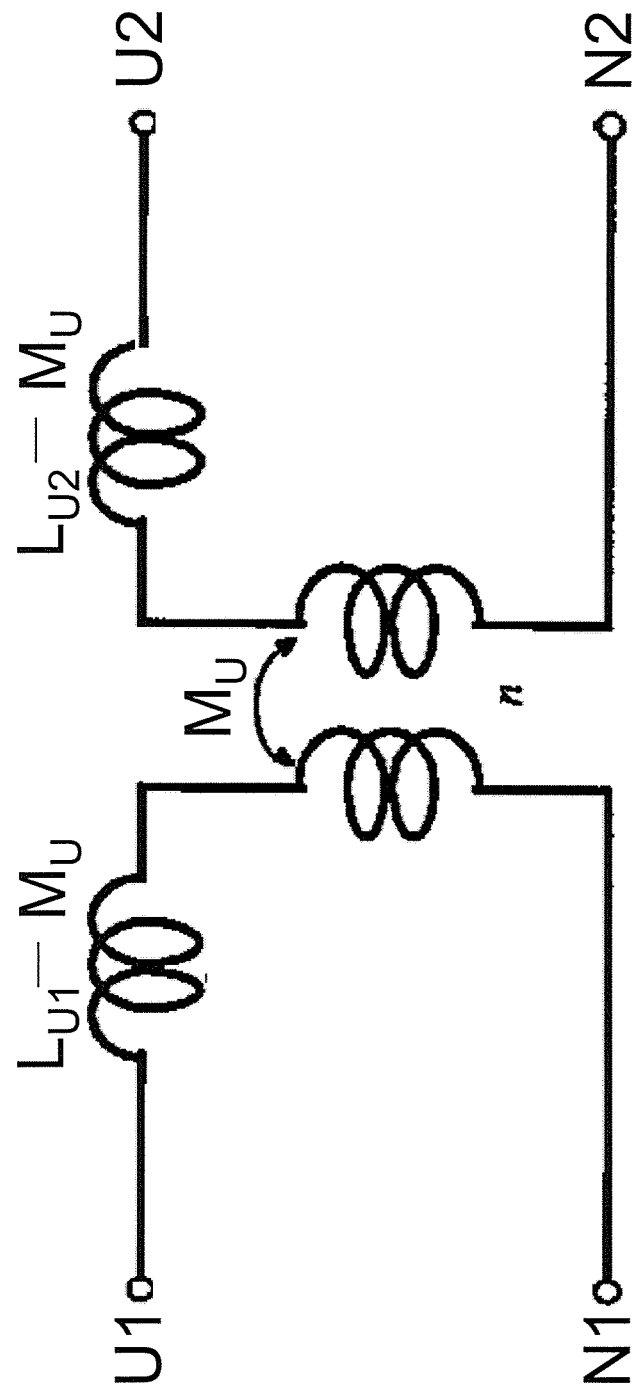
FIG. 18 is a circuit diagram illustrating an equivalent circuit of a U-phase winding of first three-phase windings and a U-phase winding of second three-phase windings of the AC rotating machine of FIG. 17.

The AC rotating machine 1B will be explained next with reference to FIG. 18. FIG. 18 is a circuit diagram illustrating an equivalent circuit of the U-phase winding U1 of the first three-phase windings and the U-phase winding U2 of the second three-phase windings of the AC rotating machine 1B of FIG. 17.

The AC rotating machine 1B is a permanent magnet synchronous rotating machine and has two sets of three-phase windings of first three-phase windings and second three-phase windings. Specifically, the AC rotating machine 1B has first three-phase windings made up of a U-phase winding U1, a V-phase winding V1 and a W-phase winding W1, and second three-phase windings made up of a U-phase winding U2, a V-phase winding V2 and a W-phase winding W2. The AC rotating machine 1B has a rotor (not shown) configured so that field magnetic flux is generated by permanent magnets or by field system windings.

In the first three-phase windings and the second three-phase windings, the U1 phase and the U2 phase, the V1 phase and the V2 phase, and the W1 phase and the W2 phase are all disposed at phase differences corresponding to an electrical angle of 30 degrees, as illustrated in FIG. 10 and FIG. 11 above. Defining the direction of magnetic flux generated by the rotor of the AC rotating machine 1B as the d-axis, and defining as the q-axis a direction advanced from the d-axis by an electrical angle of 90 degrees, the angle formed by the U-phase winding U1 and the d-axis is θ degrees and the angle formed by the U-phase winding U2 and the d-axis is (θ-30) degrees.

The respective first three-phase windings and second three-phase windings are not electrically connected, but are magnetically coupled by way of a magnetic circuit that makes up the AC rotating machine 1B. In other words, the first three-phase windings and second three-phase windings are in a coupled state, such as that of the primary side and the secondary side of a transformer. Therefore, the equivalent circuit of the U-phase winding U1 and of the U-phase winding U2 disposed in parallel can be represented as depicted in FIG. 18.

In FIG. 18, Mu represents armature-winding mutual inductance, Lu1 represents armature-winding self inductance of the first three-phase windings, and Lu2 represents armature-winding self inductance of the second three-phase windings. Further, (Lu1−Mu) represents leakage inductance of the first three-phase windings and (Lu2−Mu) represents leakage inductance of the second three-phase windings. Further, n corresponds to the turn ratio of a transformer.

Among these values, in particular (Lu1−Mu) and Mu, and (Lu2−Mu) and Mu, are values between two phases of the first three-phase windings and second three-phase windings disposed in parallel, and are different from values between phases as used in motor control. The values between phases used in motor control are a value between the U-phase and the V-phase, between the V-phase and the W-phase, or between the V-phase and the W-phase.

In AC rotating machine, the numbers of turns in windings disposed in parallel are ordinarily identical, and hence there holds n=1. It is found that in this case the numbers of windings are identical not only in an equivalent circuit of the U1 phase and the U2 phase, but also in equivalent circuits of the V1 phase and the V2 phase and of the W1 phase and W2 phase.

Thus, the first three-phase windings and second three-phase windings being two sets of three-phase windings of the AC rotating machine 1B, are magnetically coupled to each other, and hence there is generated mutual interference voltage. A voltage equation in d-q axis coordinates, upon coordinate conversion of the equivalent circuit of the AC rotating machine 1B into two rotating axes, is given by Expression (10) below.

[Math. 10]

$$\begin{bmatrix} v_{d1} \\ v_{q1} \\ v_{d2} \\ v_{q2} \end{bmatrix} = \begin{bmatrix} R_1 + pL_{d1} & -\omega L_{q1} & pM_d & -\omega M_q \\ \omega L_{d1} & R_1 + pL_{q1} & \omega M_d & pM_q \\ pM_d & -\omega M_q & R_2 + pL_{d2} & -\omega L_{q2} \\ \omega M_d & pM_q & \omega L_{d2} & R_2 + pL_{q2} \end{bmatrix} \begin{bmatrix} i_{d1} \\ i_{q1} \\ i_{d2} \\ i_{q2} \end{bmatrix} + \begin{bmatrix} 0 \\ \omega \phi_1 \\ 0 \\ \omega \phi_2 \end{bmatrix} \quad (10)$$

In Expression (10), Vd1 represents the d-axis voltage of the first three-phase windings, Vd2 represents the d-axis voltage of the second three-phase windings, Vq1 represents the q-axis voltage of the first three-phase windings and Vq2 represents the q-axis voltage of the second three-phase windings. Further, id1 represents the d-axis current of the first three-phase windings, id2 represents the d-axis current of the second three-phase windings, iq1 represents the q-axis current of the first three-phase windings and iq2 represents the q-axis current of the second three-phase windings. Further, R1 represents the winding resistance of the first three-phase windings, R2 represents the winding resistance of the second three-phase windings, Ld1 represents the d-axis inductance of the first three-phase windings, Ld2 represents the d-axis inductance of the second three-phase windings, Lq1 represents the q-axis inductance of the first three-phase windings and Lq2 represents the q-axis inductance of the second three-phase windings. Further, φ1 represents the number of flux linkages of the first three-phase windings, φ2 represents the number of flux linkages of the second three-phase windings, ω represents electrical angular velocity, and p represents a differential operator. Further, Md represents d-axis mutual inductance, and Mq represents q-axis mutual inductance.

As Expression (10) reveals, interference voltage occurs between the d-axis voltage Vd2 and the q-axis voltage Vq2 of the second three-phase windings on account of the d-axis mutual inductance Md and the q-axis mutual inductance Mq, and on account of the d-axis current id1 and the q-axis current iq1 of the first three-phase windings. Similarly, interference voltage arises between the d-axis voltage Vd1 and the q-axis voltage Vq1 of the first three-phase windings due to the d-axis mutual inductance Md and the q-axis mutual inductance Mq, and the d-axis current id2 and q-axis current iq2 of the second three-phase windings.

When estimating the rotational position it is difficult to utilize a conventional induced voltage scheme, as-is, in the AC rotating machine 1B in which the relationships between the d-axis voltage and the q-axis voltage, and between the d-axis current and the q-axis current, are as given Expression (10).

In Expression (10), the matrix being the first right-side term, made up of electrical constants such as the winding resistances R, inductances L, mutual inductances M and so forth, takes the form of a matrix with 4 rows and 4 columns. A very large amount of computation is therefore required in order to improve the calculation in a conventional induced voltage scheme so that the scheme can be used with Expression (10). It is therefore difficult to implement such a rotational position estimation function in an inexpensive microcomputer, which is problematic.

In the present Embodiment 6, therefore, the rotational position estimator 61 is configured to calculate the estimated rotational position θest on the basis of the dq axes voltage sums, the dq axes current sums, and electrical constants of the AC rotating machine 1B, as in Embodiment 1 above. The effect achieved by virtue of the above configuration will be explained next.

In Expression (10), a matrix is now defined where the sum of the first row and the third row of the matrix of the first right-side term is newly set as the first row, and the sum of the second row and the fourth row is newly set as the second row. The voltage equation of Expression (10) can be worked, using this new matrix, into Expression (11) below.

[Math. 11]

$$\begin{bmatrix} v_{d1} + v_{d2} \\ v_{q1} + v_{q2} \end{bmatrix} = \begin{bmatrix} R_1 + p(L_{d1} + M_d) & -\omega(L_{q1} + M_q) \\ \omega(L_{d1} + M_d) & R_1 + p(L_{q1} + M_q) \end{bmatrix} \begin{bmatrix} i_{d1} + i_{d2} \\ i_{q1} + i_{q2} \end{bmatrix} + \begin{bmatrix} 0 \\ 2\omega\phi_1 \end{bmatrix} \quad (11)$$

In Expression (11) there hold R1=R2, Ld1=Ld2 and Lq1=Lq2.

Herein Expression (11) constitutes a voltage equation denoting the relationship between voltage sums resulting from adding the d-axis voltage Vd1 and the q-axis voltage Vq1, and the d-axis voltage Vd2 and the q-axis voltage Vq2, and current sums resulting from adding the d-axis current id1 and the q-axis current iq1, and the d-axis current id2 and the q-axis current iq2.

A comparison between Expression (11) and Expression (3) explained in Embodiment 1 above reveals that Expression (11) differs only in that herein Ld1 and Lq1 in Expression (3) have been replaced by (Ld1+Md) and (Lq1+Mq), respectively.

In contrast to Embodiment 1 above, therefore, in the present Embodiment 6 the set value Ldc of the d-axis inductance and the set value Lqc of the q-axis inductance are set as described below, and the rotational position estimator 61 calculates the estimated rotational position θest in the same way as in Embodiment 1 above.

In contrast to Embodiment 1 above, specifically, the set value Ldc of the d-axis inductance is set to yield a value resulting from further adding the set value of the d-axis mutual inductance. Specifically, the set value Ldc is set to yield the sum of a specification value or measured value of the d-axis inductance Ld1 and the d-axis inductance Ld2, and a specification value or measured value of the d-axis mutual inductance Md.

Similarly, in contrast to Embodiment 1 above, the set value Lqc of the q-axis inductance is set to yield a value resulting from further adding the set value of the q-axis mutual inductance. Specifically, the set value Lqc is set to yield the sum of a specification value or measured value of the q-axis inductance Lq1 and the q-axis inductance Lq2, and a specification value or measured value of the q-axis mutual inductance Mq.

Therefore, the estimated rotational position θest can be calculated in a simple manner just by devising a method for setting electrical constants in the rotational position estimator 61, also for the AC rotating machine 1B in which the relationships between the d-axis voltage and the q-axis voltage, and between the d-axis current and the q-axis current, are given by a complex voltage equation such as that of Expression (10).

In the present Embodiment 6, thus, the present invention is used in the AC rotating machine 1B in which the first three-phase windings and the second three-phase windings magnetically interfere with each other. That is, a rotational position estimation scheme of the present invention based on dq axes voltage sums and dq axes current sums is used in such an AC rotating machine 1B. As a result, the estimated rotational position θest can be calculated in a simple manner despite the fact that the relationships between the d-axis voltage and the q-axis voltage, and between the d-axis current and the q-axis current, are given by a complex voltage equation.

In the present Embodiment 6, a synchronous rotating machine provided with a permanent magnet in the rotor is used, as the AC rotating machine 1B, in order to obtain field magnetic flux. However, any AC rotating machine may be used as the AC rotating machine 1B, so long as in the AC rotating machine respective first three-phase windings and second three-phase windings are magnetically coupled to each other. Examples of such AC rotating machines include for instance synchronous rotating machines of field winding type, induction rotating machines and reluctance motors.

In contrast with the configuration of Embodiment 1 above, in the present Embodiment 6 an instance has been illustrated where the control target is the AC rotating machine 1B instead of the AC rotating machine 1. However, a similar effect is achieved also in a configuration that involves estimating the rotational position using either the dq axes voltage sums or the dq axes current sums, and hence the AC rotating machine 1B may serve herein as the control target, instead of the AC rotating machine 1, in the configurations of Embodiments 2 and 3 above.

By virtue of the present Embodiment 6, thus the invention of the present application can be used in an AC rotating machine in which respective first three-phase windings and second three-phase windings are magnetically coupled to each other. As a result, the estimated rotational position can be calculated in a simple manner despite the fact that the relationships between the d-axis voltage and the q-axis voltage, and between the d-axis current and the q-axis current, are given by a complex voltage equation.

Embodiment 7

In Embodiment 7 of the present invention an electric power steering device will be explained that is provided with the control device of an AC rotating machine of Embodiments 1 to 6. The control device of an AC rotating machine of Embodiments 1 to 6 can be used in an electric power steering device for generating torque that assists steering torque.

As an example, in the present Embodiment 7 an electric power steering device will be explained that is provided with the control device of an AC rotating machine of Embodiment 1 above. In the present Embodiment 7, features identical to those of Embodiment 1 will not be explained, and the explanation will focus on features different from those of Embodiment 1.

Figure 19:
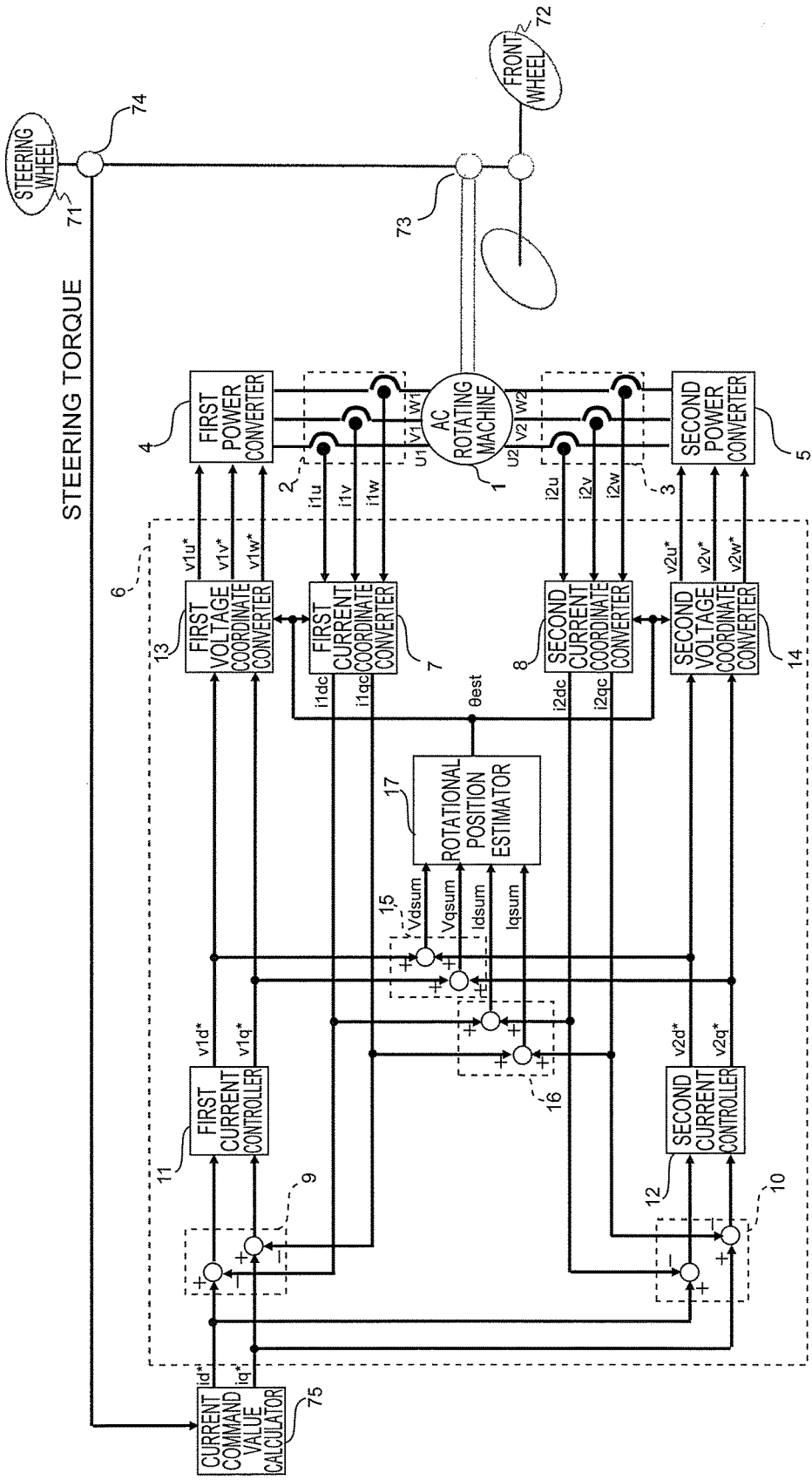
FIG. 19 is a configuration diagram illustrating the whole of an electric power steering device Embodiment 7 of the present invention.

FIG. 19 is a configuration diagram illustrating the whole of an electric power steering device of Embodiment 7 of the present invention. As illustrated in FIG. 19, the electric power steering device is provided with the AC rotating machine 1, the control device of an AC rotating machine in Embodiment 1 above, a torque detector 74 and a current command value calculator 75.

The driver of the vehicle in which the electric power steering device is installed steers the front wheels 72 by turning a steering wheel 71 left and right.

The torque detector 74 detects steering torque of a steering system, and outputs the detected steering torque to the current command value calculator 75.

The current command value calculator 75 is an example of a control command calculator that calculates a control command for the AC rotating machine 1 on the basis of the steering torque detected by the torque detector 74. Specifically, the current command value calculator 75 calculates dq axes current commands as current commands for the AC rotating machine 1, on the basis of steering torque input from the torque detector 74, in such a manner that the AC rotating machine 1 generates torque for assisting the steering torque of the steering system, and outputs the calculated dq axes current commands to the controller 6.

On the basis of the dq axes current commands input from the current command value calculator 75, the controller 6 calculates the first three-phase voltage command and second three-phase voltage command, outputs the calculated first three-phase voltage command to the first power converter 4 and outputs the calculated second three-phase voltage command to the second power converter 5. Through application of voltage from the first power converter 4 and the second power converter 5, the AC rotating machine 1 generates torque for assisting the steering torque, via a gear 73.

The present Embodiment 7 allows reducing rotational position error also for fluctuations of the electrical constants of the AC rotating machine 1, by virtue of the electric power steering device provided with the control device of an AC rotating machine of Embodiment 1 above. As a result, an estimated value of rotational position that is closer to the true rotational position of the AC rotating machine 1 can be obtained herein as the estimated rotational position θest, and hence the AC rotating machine 1 can output torque with higher precision.

As an example of the present Embodiment 7, an instance has been illustrated where in which the control device of an AC rotating machine of Embodiment 1 above is used in an electric power steering device, but herein there can be used each of the control devices of an AC rotating machine of Embodiments 2 to 6 above.

As an example, the control device of an AC rotating machine of Embodiment 5 is used in the electric power steering device in a case where the AC rotating machine 1A is utilized instead of the AC rotating machine 1. As a result it becomes possible to reduce the 6-th order component included in the estimated rotational position. Therefore, the influence of the 6-th order component generated by the AC rotating machine 1A can be reduced, and hence it becomes possible to mitigate the influence of the 6-th order component that is felt during steering of the steering wheel. A more comfortable handling of the steering wheel can be achieved as a result.

As an example, the control device of an AC rotating machine of Embodiment 6 is used in the electric power steering device in a case where the AC rotating machine 1B is utilized instead of the AC rotating machine 1. As a result, it becomes possible to estimate the rotational position in accordance with a simple calculation also when using in the electric power steering device an AC rotating machine in which the first three-phase windings and the second three-phase windings are magnetically coupled to each other, and hence it becomes possible to realize a controller for estimating rotational position in an inexpensive microcomputer.

In the present Embodiment 7, thus, the electric power steering device is configured by being provided with: the control device of an AC rotating machine; a torque detector that detects steering torque; and a control command calculator that calculates a control command for the AC rotating machine on the basis of the steering torque detected by the torque detector, in such a manner that the AC rotating machine generates torque that assists the steering torque.

As a result, an estimated value of rotational position that is closer to the true rotational position of the AC rotating machine can be used herein as the estimated rotational position, and hence the AC rotating machine can output torque with higher precision.

In the present Embodiments 1 to 7, instances have been illustrated where a voltage sum and a current sum are worked out in d-q axes, being two rotating axes, i.e. instances where dq axes voltage sums and dq axes current sums are calculated, but the present invention is not limited thereto. Specifically, identical effects are elicited also when a voltage sum based on N sets of voltage commands for applying AC voltage to N sets of three-phase windings, and a current sum based on N sets of currents flowing respectively in the N sets of three-phase windings are worked out in stationary coordinates. Stationary coordinates denote herein α-β axes being three-phase stationary coordinates or two-phase orthogonal stationary coordinates.

With reference to FIG. 8, the content ratio of harmonics with respect to a fundamental wave, for current sums in the three-phase stationary coordinate illustrated at the bottom i.e. i1$u$+i2$u$, i1$v$+i2$v$, i1$w$+i2$w$, is lower than that for the currents of various groups, i.e. i1$u$, i1$v$, i1$w$, i2$u$, i2$v$, i2$w$. In FIG. 8 waveforms are illustrated in an instance where N is 2, but an instance where N is 3 or greater would yield similar waveforms.

Therefore, an effect of enhancing the precision of the estimation position identical to that of current sums in the two rotating axes is achieved, also when current sums are calculated in three-phase stationary coordinates, and the rotational position is estimated on the basis of the calculated current sums. It goes without saying, that the same effect is elicited in a case where the current sums are calculated on two-phase orthogonal stationary coordinates. Needless to say, moreover, there is elicited an effect of the enhancing the precision of estimated position similar to that when voltage sums are calculated in two rotating axes, also in a case where the voltage sums are calculated in three-phase stationary coordinates or two-phase orthogonal stationary coordinates.

Specific examples of the present Embodiments 1 to 7 have been explained above, but the features of the various embodiments can be combined arbitrarily. It is evident that in such a case there is achieved an overlapping effect of the various embodiments.

The invention claimed is:

1. A control device of an AC rotating machine estimating, as an estimated rotational position, a rotational position of the AC rotating machine having N sets of three-phase windings, where N is a natural number equal to or greater than 2, the control device comprising:
a current detector that detects and outputs N sets of currents respectively flowing in N sets of three-phase windings;
a controller that calculates and outputs respective N sets of voltage commands for the N sets of three-phase windings on the basis of a control command for the AC rotating machine and the N sets of currents input from the current detector; and
a power converter that applies AC voltage to the N sets of three-phase windings on the basis of the input N sets of voltage commands, wherein
the controller has
a voltage sum calculator that calculates and outputs a voltage sum from the input N sets of voltage commands;
a current sum calculator that calculates and outputs a current sum from the input N sets of currents; and
a rotational position estimator that calculates the estimated rotational position on the basis of the input voltage sum and the input current sum,
wherein the voltage sum calculator calculates, as the voltage sum, a value resulting from multiplying, by N, any one of the N sets of voltage commands; and
the current sum calculator calculates, as the current sum, a value resulting from adding each of the N sets of currents.

2. The control device of the AC rotating machine claim 1, wherein
N is 2,
the AC rotating machine has first three-phase windings and second three-phase windings, as two sets of three-phase windings,
the current detector is made up of:
a first current detector that detects first three-phase winding currents flowing in the first three-phase windings; and
a second current detector that detects second three-phase winding currents flowing in the second three-phase windings,
the controller calculates a first three-phase voltage command for the first three-phase windings and a second three-phase voltage command for the second three-phase windings on the basis of the control command for the AC rotating machine, and on the basis of first three-phase winding currents and second three-phase winding currents input as two sets of currents, and
the power converter is made up of:
a first power converter that applies the AC voltage to the first three-phase windings on the basis of the input first three-phase voltage command; and
a second power converter that applies the AC voltage to the second three-phase windings on the basis of the input second three-phase voltage command.

3. The control device of the AC rotating machine of claim 2, wherein when n is a natural number equal to or greater than 4,
the controller calculates the first three-phase voltage command and the second three-phase voltage command so that a phase of the first three-phase voltage command and a phase of the second three-phase voltage command are shifted by only (180/n) degrees from each other.

4. The control device of the AC rotating machine of claim 2, wherein
the AC rotating machine is a permanent magnet synchronous rotating machine; and when n is a natural number equal to or greater than 4 and m is a natural number,
there is a phase difference of (180/n) degrees between the first three-phase windings and the second three-phase windings, and
an (n×m±1)-th order component is included in first three-phase induced voltages that are induced in the first three-phase windings and in second three-phase induced voltages that are induced in the second three-phase windings, as a result of the rotation of the AC rotating machine.

5. The control device of the AC rotating machine of claim 2, wherein the first three-phase windings and the second three-phase windings are magnetically coupled to each other.

6. An electric power steering device, comprising:
the control device of the AC rotating machine of claim 1:
a torque detector that detects steering torque; and
a control command calculator that calculates a control command for the AC rotating machine on the basis of the steering torque detected by the torque detector, so that the AC rotating machine generates torque that assists the steering torque.

7. A control device of an AC rotating machine estimating, as an estimated rotational position, a rotational position of the AC rotating machine having N sets of three-phase windings, where N is a natural number equal to or greater than 2,
the control device comprising:
a current detector that detects and outputs N sets of currents respectively flowing in N sets of three-phase windings;
a controller that calculates and outputs respective N sets of voltage commands for the N sets of three-phase windings on the basis of a control command for the AC rotating machine and the N sets of currents input from the current detector; and
a power converter that applies AC voltage to the N sets of three-phase windings on the basis of the input N sets of voltage commands, wherein
the controller has
a voltage sum calculator that calculates and outputs a voltage sum from the input N sets of voltage commands;
a current sum calculator that calculates and outputs a current sum from the input N sets of currents; and
a rotational position estimator that calculates the estimated rotational position on the basis of the input voltage sum and the input current sum, wherein
the voltage sum calculator calculates, as the voltage sum, a value resulting from adding each of the N sets of voltage commands; and
the current sum calculator calculates, as the current sum, a value resulting from multiplying, by N, any one of the N sets of currents.

8. A control device of an AC rotating machine estimating, as an estimated rotational position, a rotational position of the AC rotating machine having N sets of three-phase windings, where N is a natural number equal to or greater than 2,
the control device comprising:
a current detector that detects and outputs N sets of currents respectively flowing in N sets of three-phase windings;
a controller that calculates and outputs respective N sets of voltage commands for the N sets of three-phase windings on the basis of a control command for the AC rotating machine and the N sets of currents input from the current detector; and a power converter that applies AC voltage to the N sets of three-phase windings on the basis of the input N sets of voltage commands, wherein the controller has a voltage sum calculator that calculates and outputs a voltage sum from the input N sets of voltage commands;

a current sum calculator that calculates and outputs a current sum from the input N sets of currents; and a rotational position estimator that calculates the estimated rotational position on the basis of the input voltage sum and the input current sum, wherein the controller has a current coordinate converter that calculates and outputs N sets of d-axis currents and N sets of q-axis currents respectively flowing in the N sets of three-phase windings, by coordinate conversion of the input N sets of currents into two rotating axes on the basis of the estimated rotational position;

a current controller that calculates and outputs N sets of d-axis voltage commands and N sets of q-axis voltage commands, as the N sets of voltage commands, on the basis of the control command for the AC rotating machine, and on the basis of the input N sets of d-axis currents and N sets of q-axis currents; and a voltage coordinate converter that calculates and outputs N sets of three-phase voltage commands by coordinate conversion into two rotating axes of the input N sets of d-axis voltage commands and N sets of q-axis voltage commands on the basis of the estimated rotational position, and wherein the voltage sum calculator calculates, as the voltage sum, a d-axis voltage sum from the N sets of d-axis voltage commands and a q-axis voltage sum from the N sets of q-axis voltage commands, respectively; and the current sum calculator calculates, as the current sum, a d-axis current sum from the N sets of d-axis currents and a q-axis current sum from the N sets of q-axis currents, respectively.

9. The control device of the AC rotating machine of claim 8, wherein the voltage sum calculator calculates, as the voltage sum, a value resulting from adding each of the N sets of voltage commands; and the current sum calculator calculates, as the current sum, a value resulting from adding each of the N sets of currents.

* * * * *